United States Patent
Ashby

[11] Patent Number: 6,113,345
[45] Date of Patent: Sep. 5, 2000

[54] METHOD FOR SINGULATING A DISK

[76] Inventor: Harrel Dean Ashby, 11913 Rosemeade Ct., Oklahoma City, Okla. 73162

[21] Appl. No.: 09/454,819

[22] Filed: Dec. 3, 1999

Related U.S. Application Data

[63] Continuation-in-part of application No. 08/968,533, Nov. 12, 1997, Pat. No. 5,975,839, and a continuation of application No. 09/314,734, May 18, 1999, Pat. No. 6,024,532.

[51] Int. Cl.⁷ .................................................. B65G 59/06
[52] U.S. Cl. .......................................................... 414/801
[58] Field of Search ................................ 414/801, 798.1, 414/797.8, 798, 941; 221/36, 37, 223, 297

[56] References Cited

U.S. PATENT DOCUMENTS

| | | | |
|---|---|---|---|
| 4,529,101 | 7/1985 | Orlowski | 221/223 |
| 4,644,427 | 2/1987 | Ashby | 360/98 |
| 5,050,023 | 9/1991 | Ashby | 360/98.06 |
| 5,383,571 | 1/1995 | Gunderson | 221/223 |
| 5,482,428 | 1/1996 | Kuhlman | 414/798 |
| 5,611,436 | 3/1997 | Ashby | 209/573 |
| 5,738,246 | 4/1998 | Chung | 221/297 |
| 5,902,092 | 5/1999 | Erlandson et al. | 414/797.4 |
| 5,906,472 | 5/1999 | Nakamura | 414/798.1 |
| 5,941,681 | 8/1999 | Piotrowski et al. | 414/797.8 |
| 6,024,532 | 2/2000 | Ashby | 414/798.1 |

FOREIGN PATENT DOCUMENTS

| | | | |
|---|---|---|---|
| 403272156 | 12/1991 | Japan | 414/941 |
| 1382553 | 3/1998 | U.S.S.R. | 414/797.8 |
| 8402575 | 7/1987 | WIPO | 414/797.8 |

*Primary Examiner*—Douglas Hess
*Attorney, Agent, or Firm*—Dunlap, Codding & Rogers, P.C.

[57] ABSTRACT

An apparatus for discharging disks from the bottom of a stack of aligned disks one at a time is provided. The apparatus includes a pair of feed gate subassemblies supported in a spaced apart, diametrically opposing relationship so as to define a disk receiving opening therebetween. The feed gate subassemblies are adapted to cooperatively support the stack of disks in the disk receiving opening and sequentially engage opposing portions of the outer peripheral edge of the disk positioned at the bottom of the stack of disks so as to cause the bottom disk to be discharged from the stack of disks.

1 Claim, 16 Drawing Sheets

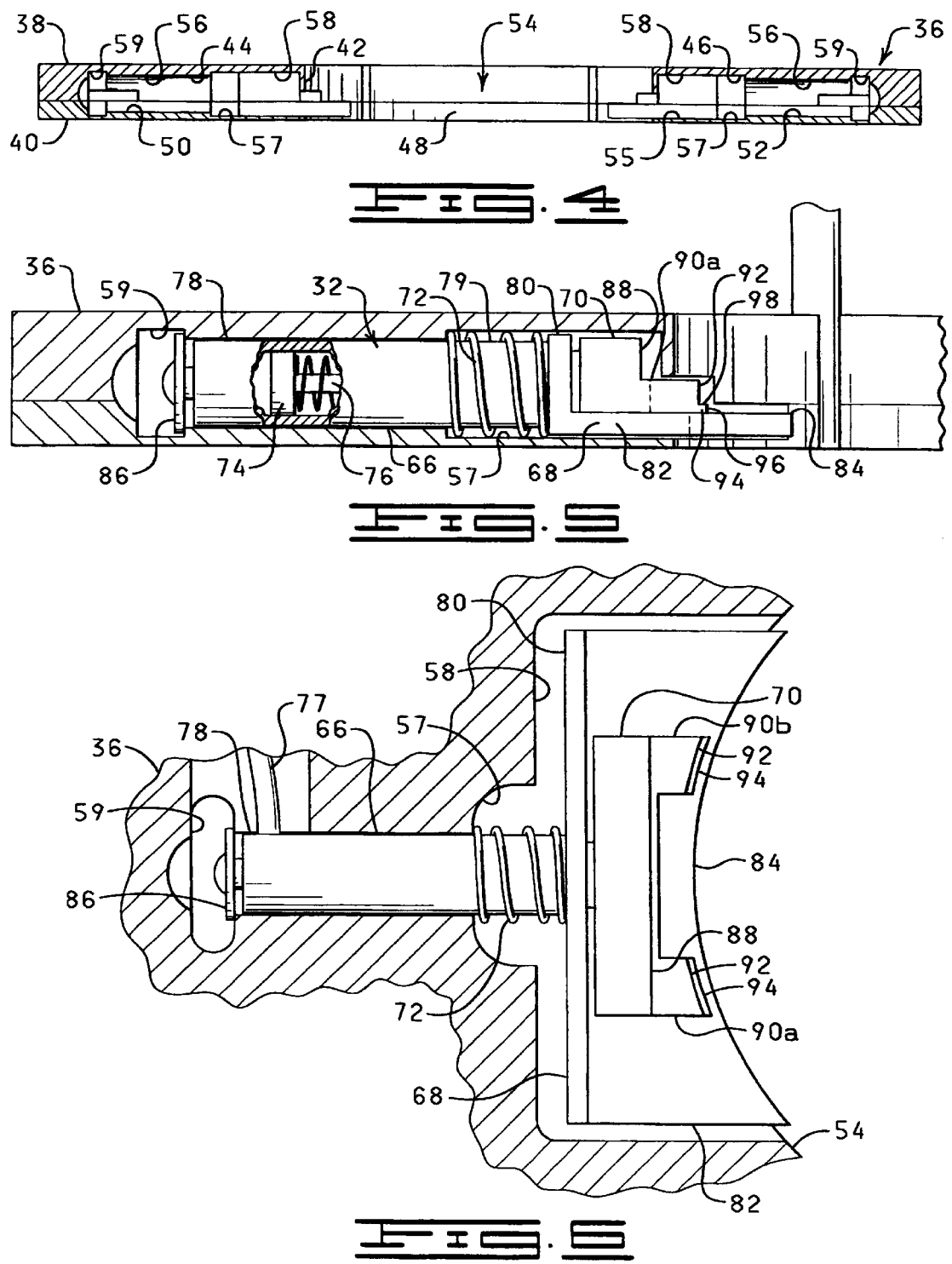

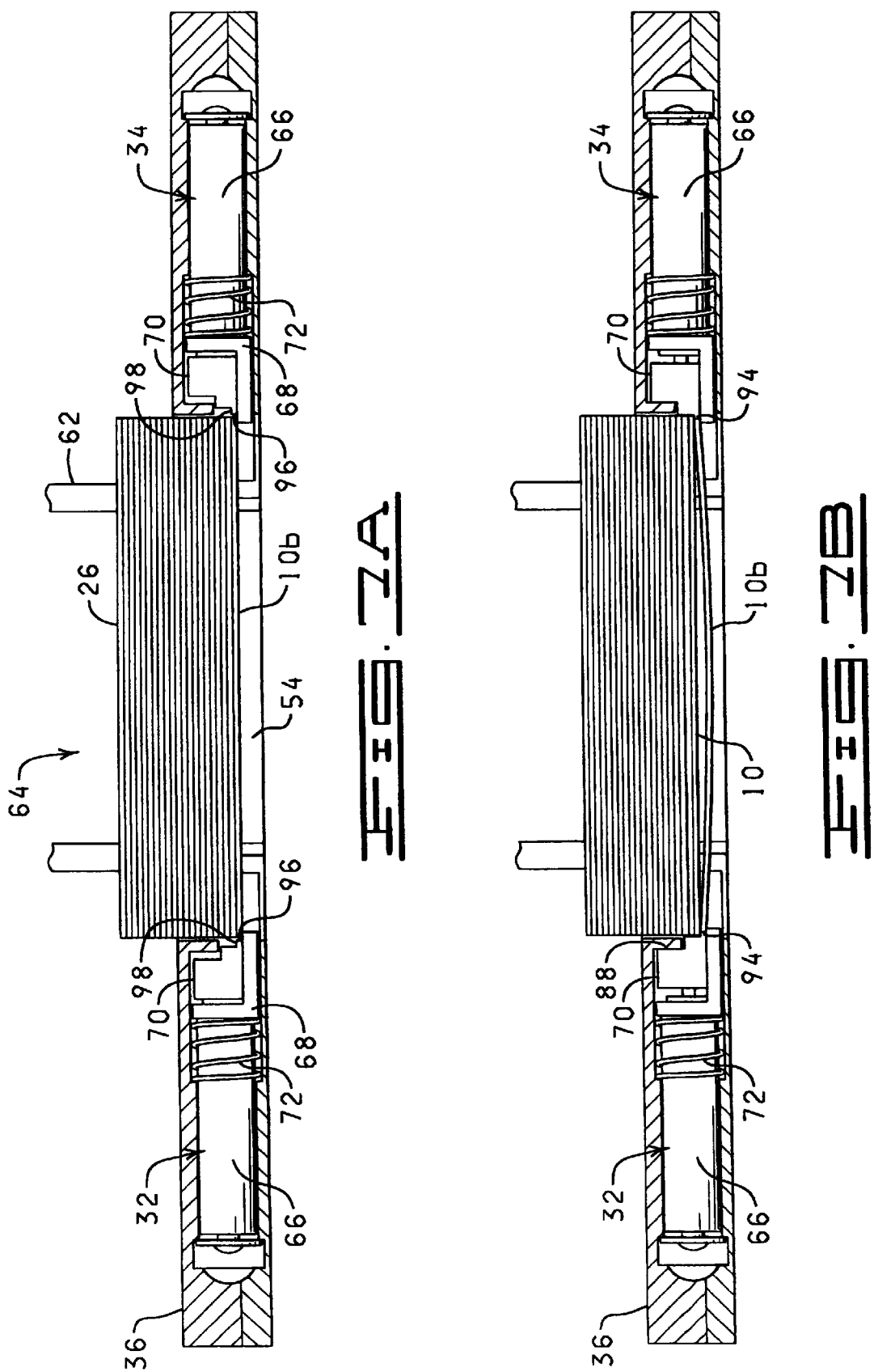

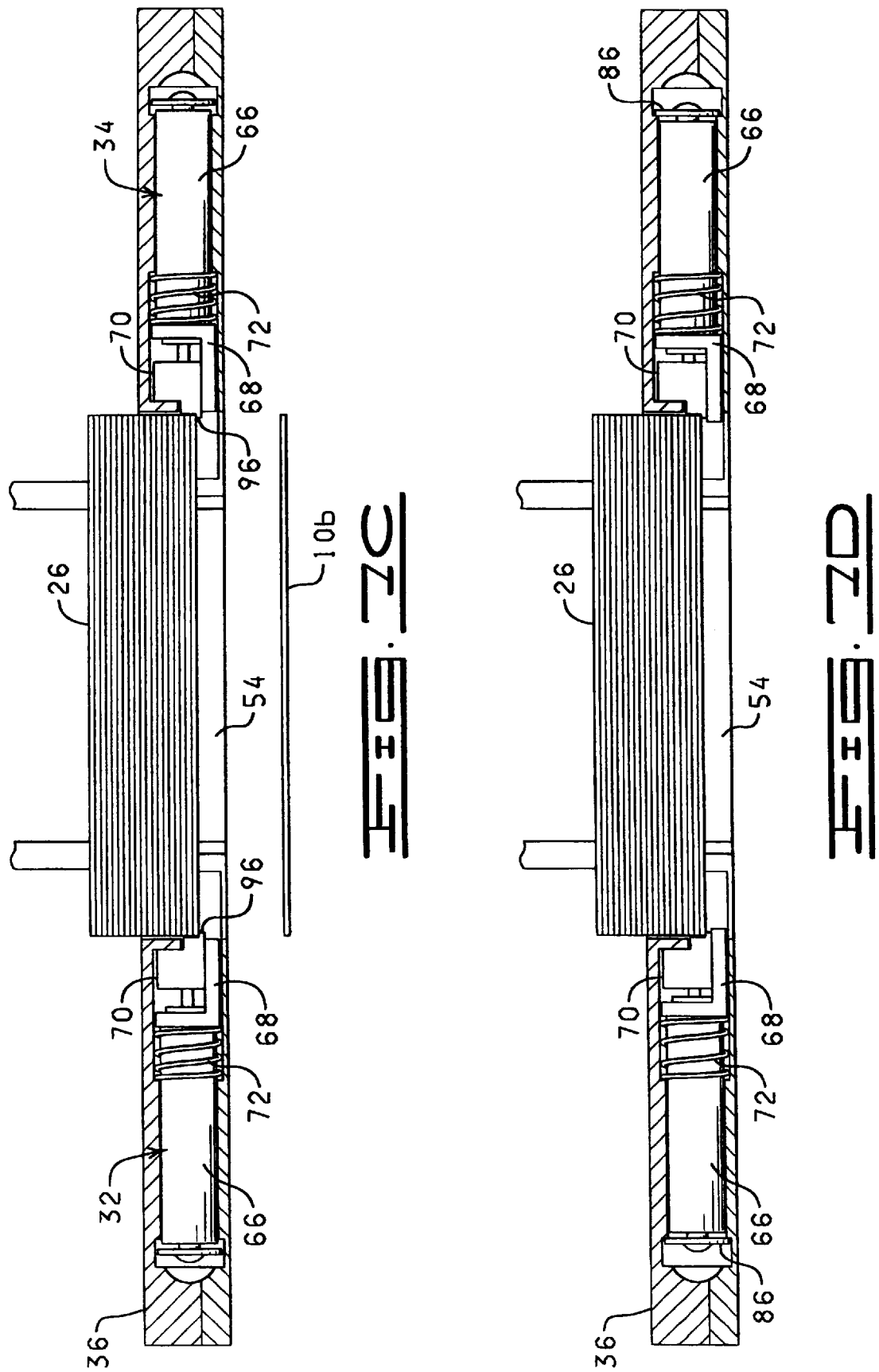

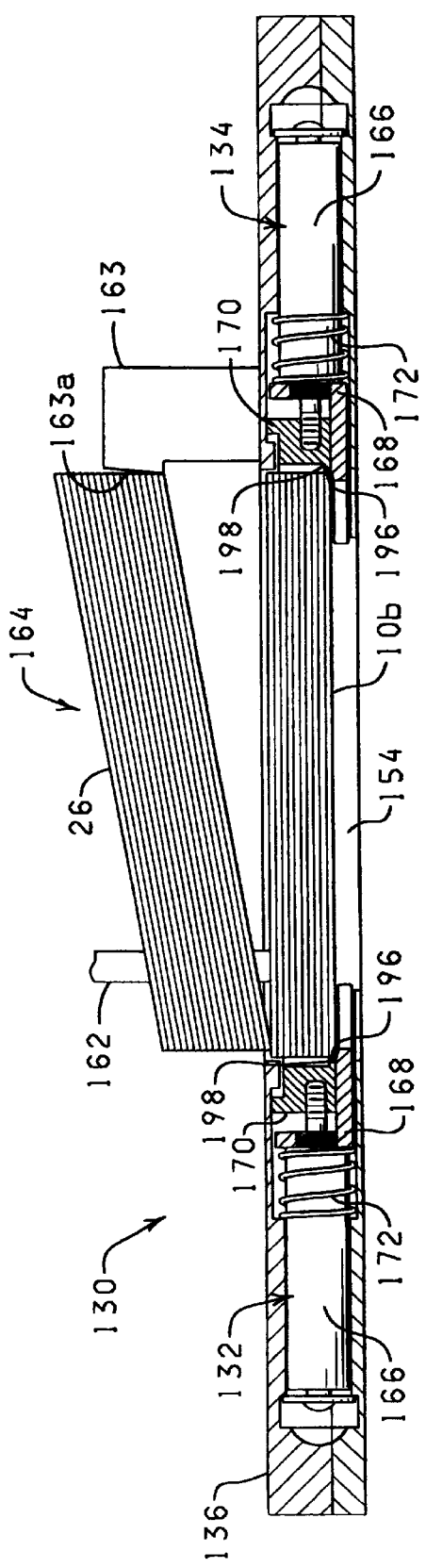
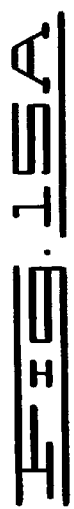
Fig. 15A
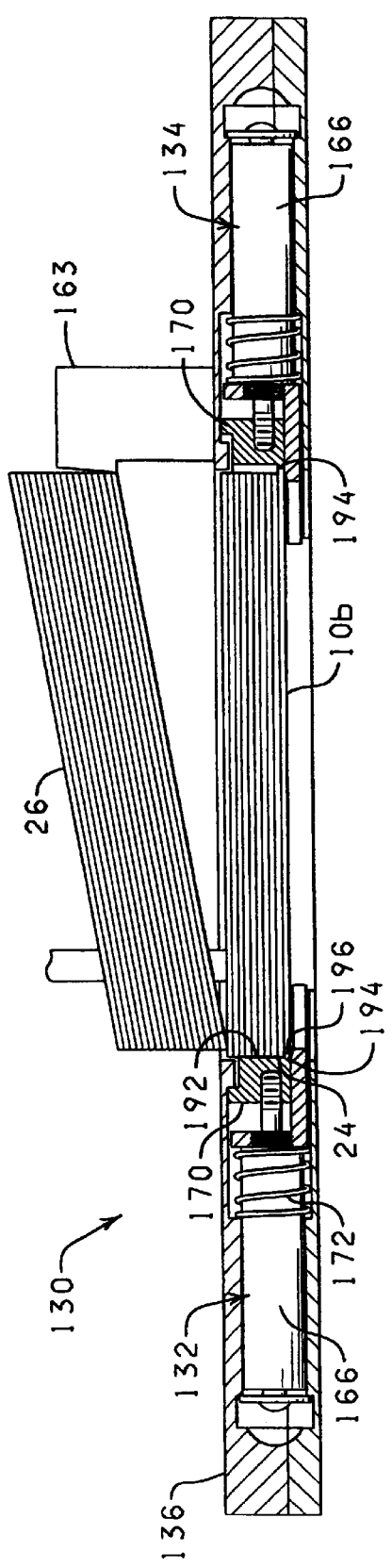
Fig. 15B

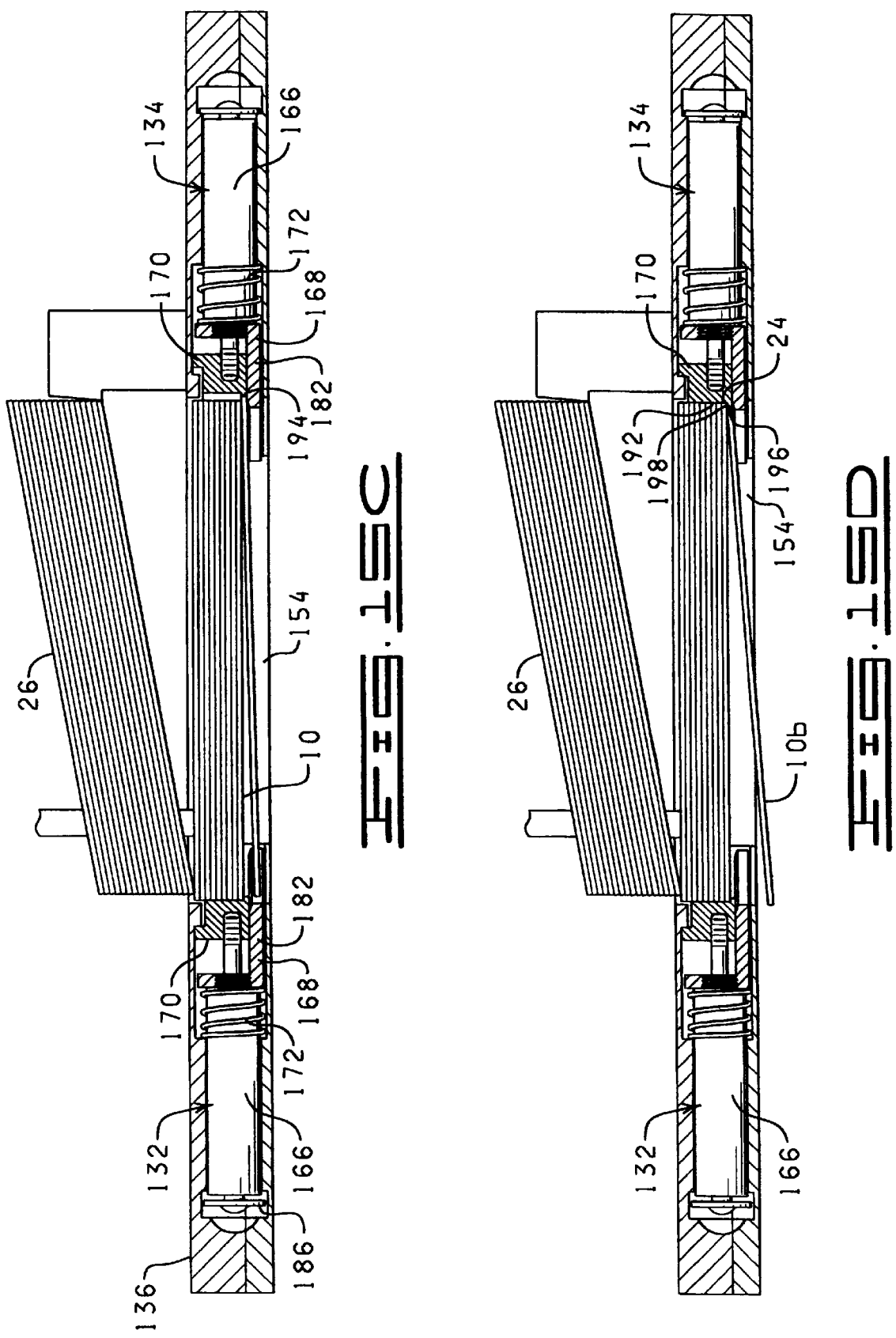

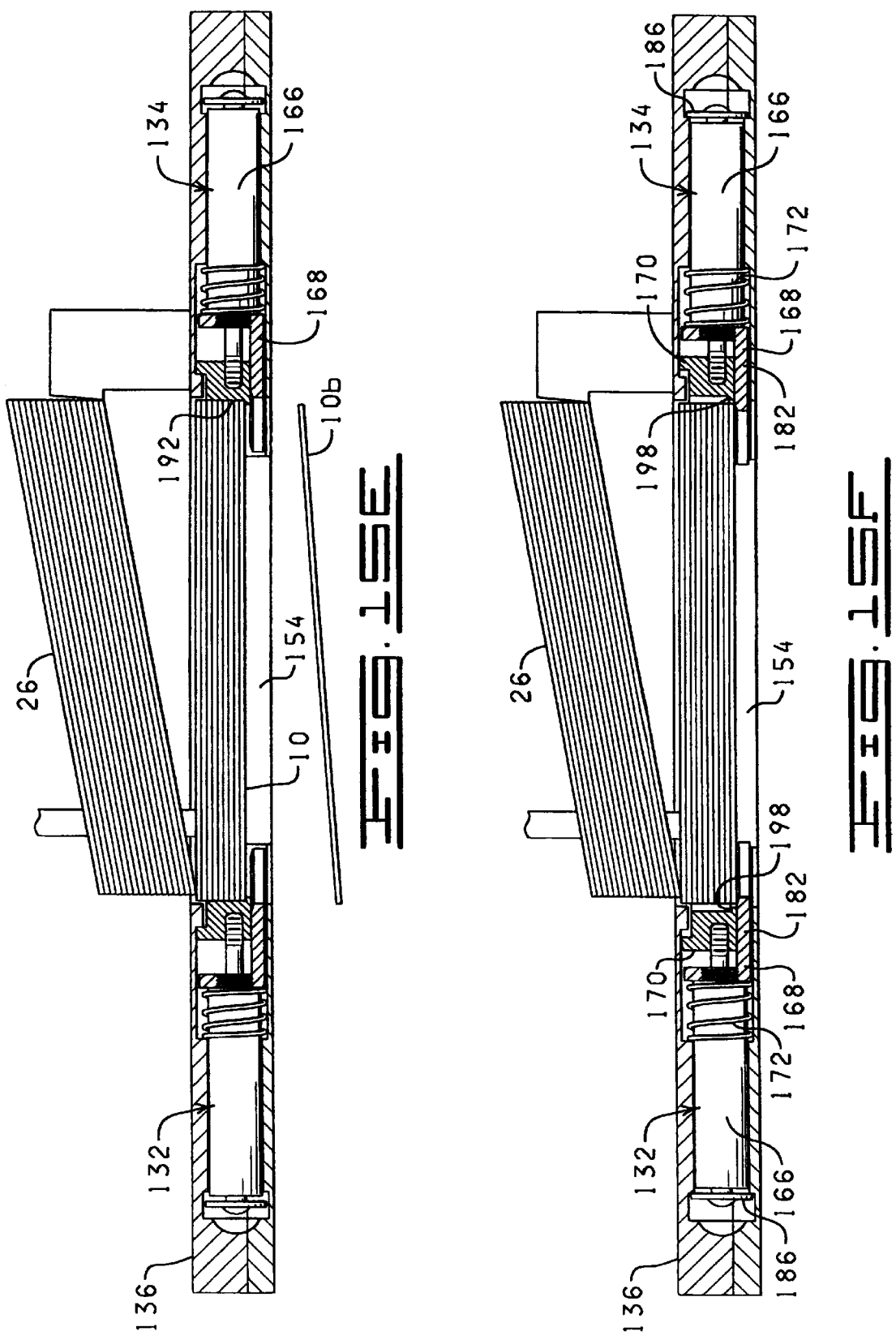

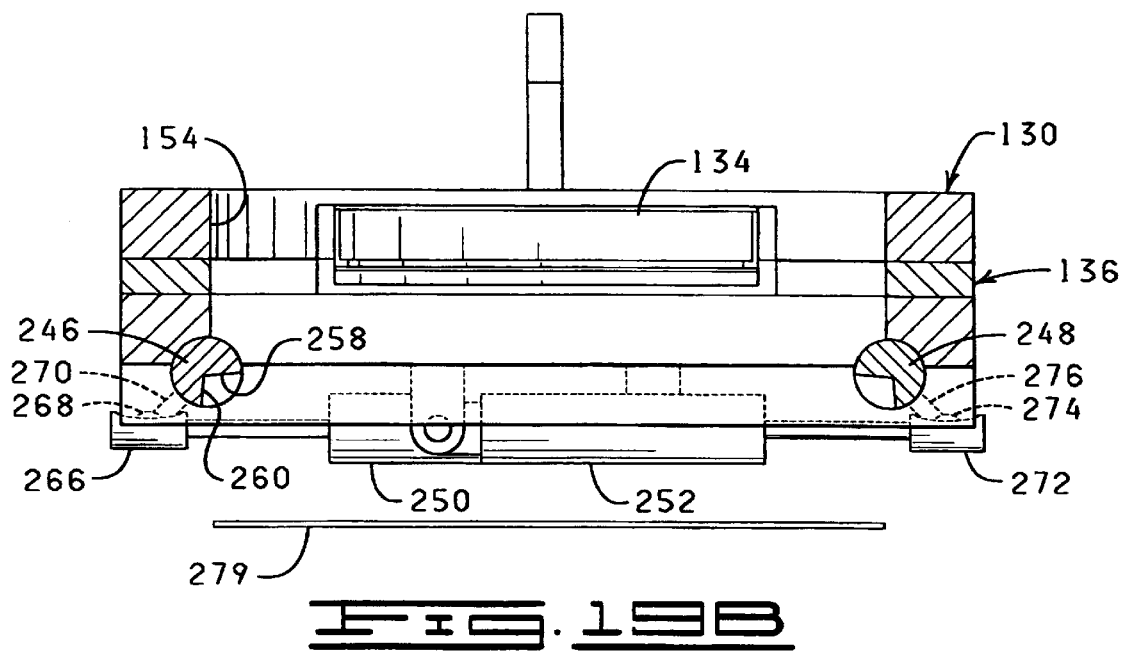

METHOD FOR SINGULATING A DISK

CROSS-REFERENCE TO RELATED APPLICATIONS

This application is a continuation-in-part of U.S. Ser. No. 08/968,533, filed Nov. 12, 1997 now U.S. Pat. No. 5,975,839.

This is a continuation of application(s) Ser. No. 09/314,734 filed on May 18, 1999 now U.S. Pat. No. 6,024,532.

STATEMENT REGARDING FEDERALLY SPONSORED RESEARCH OR DEVELOPMENT

Not applicable.

BACKGROUND OF THE INVENTION

1. Field of the Invention.

The present invention relates generally to optical disk handling devices, and more particularly, but not by way of limitation, to an apparatus for separating a single optical disk from the bottom of a stack of optical disks for the purpose of labeling, packaging, duplicating, inspecting, or performing other processing steps on the separated optical disk.

2. Brief Description of the Related Art.

An optical disk is a storage medium that holds information in the form of a pattern of marks on a platter. An optical-disk drive in turn reads, erases, or writes data on the disk with a laser beam. Examples of optical disks include CD-Audio, CD-Video, CD-ROM, CD-R, WORM, DVD, and DVD-ROM. The use of optical disks for storing data has evolved rapidly in recent years and continues to evolve in that optical disks are able to store a large amount of information in a small space and optical disks are extremely durable with some types of optical disks expected to last many decades.

Optical disks are generally fabricated of a clear plastic base impressed on one side thereof with information. A reflective layer of aluminum, gold, or the like is then applied to the base and covered with a lacquer coating for protection. During the final stages of production, the disk is printed with graphics, inspected, and packaged.

In order to meet the high demand for optical disks, large numbers of optical disks must be rapidly produced. Therefore, devices have been designed to hold such disks in bulk and to individually feed the disks to various pieces of production equipment. Such devices typically include a robotic swing arm provided with a vacuum system which removes the optical disk positioned on the top of a stack of disks, delivers the removed disk to the processing equipment, and then returns to remove the next disk. While these types of devices have achieved varying degrees of success, their inherent complexity results in a device that is expensive to manufacture and requires a high degree of attention to maintain. In addition, by removing the disk from the top of the stack, operation of these devices must be periodically interrupted to replenish the supply of disks, or the device must be provided with a carousel mechanism adapted to hold multiple stacks of optical disks. To this end, it would be desirable to be able to separate the disk located at the bottom of the stack whereby one stack could be continually replenished without having to halt production.

Several devices have previously been proposed for removing a disk-like object from the bottom of a stack. One such device is disclosed in U.S. Pat. No. 5,050,023, issued to H. D. Ashby, the present inventor. The Ashby '023 patent discloses a mechanism for separating a floppy diskette from the bottom of a stack of floppy diskettes. The mechanism includes a pair of opposing feed subassemblies which function to position a pair of opposing, wedge-shaped ribs between the bottom diskette and the adjacent diskette so as to support the stack while allowing the bottom diskette to be released from the stack.

U.S. Pat. No. 5,611,436, issued to H. D. Ashby, discloses the use of a similar mechanism for separating a PC card from the bottom of a stack of PC cards.

While such mechanisms have successfully met the need for rapid and reliable handling of diskettes and PC cards, problems are encountered when attempting to employ the same mechanism for separating optical disks. It has been found that these problems stem from the structural differences between diskettes and PC cards relative to an optical disk. In addition to the obvious difference that diskettes and PC cards are square and rectangular in shape while an optical disk is circularly shaped, the outer peripheral edges of the jackets of diskettes and PC cards are slightly rounded. This results in a peripheral notch or indentation being formed between each diskette or PC card when the diskettes and PC cards are aligned in a stack. The formation of this notch provides an accessible space into which a wedge member can be easily inserted to separate adjacent diskettes or PC cards. In contrast, the outer peripheral edge of the plastic base of an optical disk is substantially squared relative to the opposing planar faces of the base. As such, when optical disks are arranged in a stack with the outer peripheral edges aligned, there is no readily accessible space provided between the optical disks into which a wedge device can be reliably inserted to separate adjacent optical disks.

To this end, a need exists for an apparatus which can separate an optical disk from the bottom of a stack of optical disks without affecting the integrity of the disk, and which has a minimum of moving parts to provide low cost maintenance while reliably handling large numbers of optical disks. It is to such an apparatus that the present invention is directed.

BRIEF SUMMARY OF THE INVENTION

The present invention is directed to an apparatus for discharging optical disks from the bottom of a stack of aligned optical disks one at a time. The apparatus includes a pair of feed gate subassemblies supported in a spaced apart, diametrically opposing relationship so as to define a disk receiving opening therebetween. The feed gate subassemblies are adapted to cooperatively support the stack of optical disks in the optical disk receiving opening and abuttingly engage at least a portion of the outer peripheral edge of the optical disk positioned at the bottom of the stack of optical disks to discharge the bottom optical disk from the stack of optical disks.

Each feed gate subassembly includes a cylinder, a support flange, a clamp block, and a spring. Each cylinder has a piston slidably disposed therein so as to be adapted for reciprocating movement relative to the cylinder and a piston rod having one end connected to the piston so that the piston rod is reciprocatingly movable relative to the cylinder. The piston rods extend in a radially inward direction toward the disk receiving opening. The support flanges are rigidly connected to the cylinder and extendible into the disk receiving opening for supporting the stack of optical disks. The clamp blocks are connected to a distal end of the piston rod and have an inwardly extending lip which has an edge engaging surface and a stack support surface. The clamp blocks are positioned relative to the support flange so that the edge engaging surface of the clamp blocks are abuttingly engagable with a portion of the outer peripheral edge of the optical disk positioned at the bottom of the stack of optical disks and supported by the support flange upon movement of the clamp blocks to a disk engaging position.

The springs resiliently bias the cylinders and the support flanges in a radial inward direction such that the support flanges extend into the disk receiving opening a distance sufficient to support the stack of optical disks when the edge engaging surfaces of the clamp block is in a non-engaging relationship relative to the outer peripheral edge of the bottom optical disk. The springs additionally permit the cylinders and the support flanges to slide in a radial outward direction such that the support flanges are moved to a non-supporting position relative to the stack of optical disks upon actuation of the clamp blocks to the disk engaging position.

The apparatus includes means for selectively actuating the clamp block of one of feed gate subassembly into the edge engaging position to move the bottom disk laterally relative to the remainder of the stack of disks. This in turn causes the cylinder and the support flange of the feed gate subassembly to move in the radial outward direction such that the support flange of the feed gate subassembly is moved to the non-supporting position to free the bottom disk of the support flange of the first feed gate subassembly while the stack support surface of the clamp block of the feed gate subassembly is maintained in a position beneath at least a portion of the adjacently disposed disk to support the remainder of the stack of disks. The apparatus further includes means for selectively actuating the clamp block of the other feed gate subassembly into the edge engaging position, subsequent to the support flange of the first feed gate subassembly moving to the non-supporting position, to move the bottom disk laterally relative to the remainder of the stack of disks. This in turn causes the cylinder and the support flange of the second feed gate subassembly to move in the radial outward direction such that the support flange of the second feed gate subassembly is moved to the non-supporting position to free the bottom disk of the support flange of the second feed gate subassembly and thus discharge the bottom disk from the stack while the stack support surface of the clamp block of the second feed gate subassembly is maintained in a position beneath at least a portion of the adjacently disposed disk to cooperate with the stack support surface of the first feed gate subassembly to support the remainder of the stack of disks.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 4 is a cross-sectional view of the housing.

FIG. 5 is a partially cutaway, side elevational view of one of the feed gate subassemblies.

FIG. 6 is a partially cutaway, top view of the feed gate subassembly of FIG. 5.

FIGS. 7A–7D are partial cutaway, side elevational views of the singulating apparatus of the present invention illustrating the sequential operation of the singulating apparatus in discharging an optical disk from the bottom of a stack of optical disks.

FIGS. 15A–15F are partial cutaway, side elevational views of the singulating apparatus of the present invention illustrating the sequential operation of the singulating apparatus in discharging an optical disk from the bottom of a stack of optical disks.

FIG. 19B is a cross sectional view of the disk conveying apparatus taken along line 19A—19A in FIG. 16 illustrating the disk valve assembly in an open position.

DETAILED DESCRIPTION OF THE INVENTION

Figure 1:
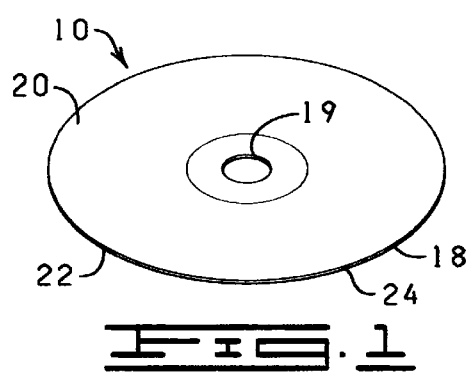
FIG. 1 is a perspective view of an optical disk.

Referring now to the drawings, and more particularly to FIG. 1, shown therein is an optical disk 10. "Optical disk" as used herein means any storage medium that holds information in the form of a pattern of marks on a platter. Examples of optical disks include CD, CD-ROM, CD-R, WORM, DVD, and DVD-ROM. The optical disk 10 generally includes a clear plastic base 18 into which information is impressed in or otherwise formed on one side thereof. The base 18 includes a central opening 19, a pair of parallel, planar surfaces 20 and 22, and an outer peripheral edge 24. A reflective layer, typically aluminum, is applied to the one of the planar surfaces 20 or 22 of the base 18 and the reflective layer is covered with a lacquer coating for protection.

Figure 1A:
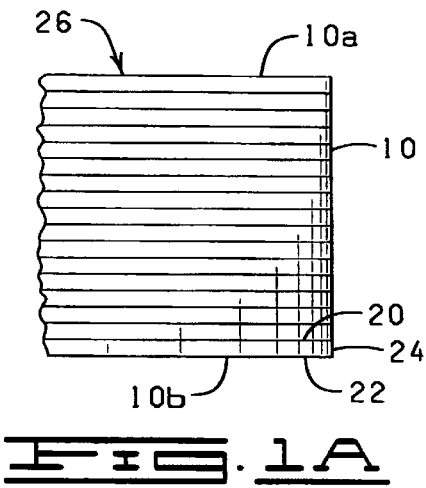
FIG. 1A is a fragmental, side elevational view of a stack of optical disks.

FIG. 1A depicts a portion of a plurality of optical disks 10 aligned and arranged in a stack 26. The stack 26 includes a top disk 10a and a bottom disk 10b. As best illustrate in FIG. 1A, the outer peripheral edge 24 of each optical disk 10 extends between the planar surfaces 20 and 22 in a substantially perpendicular relationship relative thereto. As such, when the optical disks 10 are aligned and stacked as shown in FIG. 1A, there is no readily accessible space provided between adjacent optical disks 10 along the periphery of the optical disks 10 into which a wedge can be accurately inserted to separate adjacent optical disks.

Figure 2:
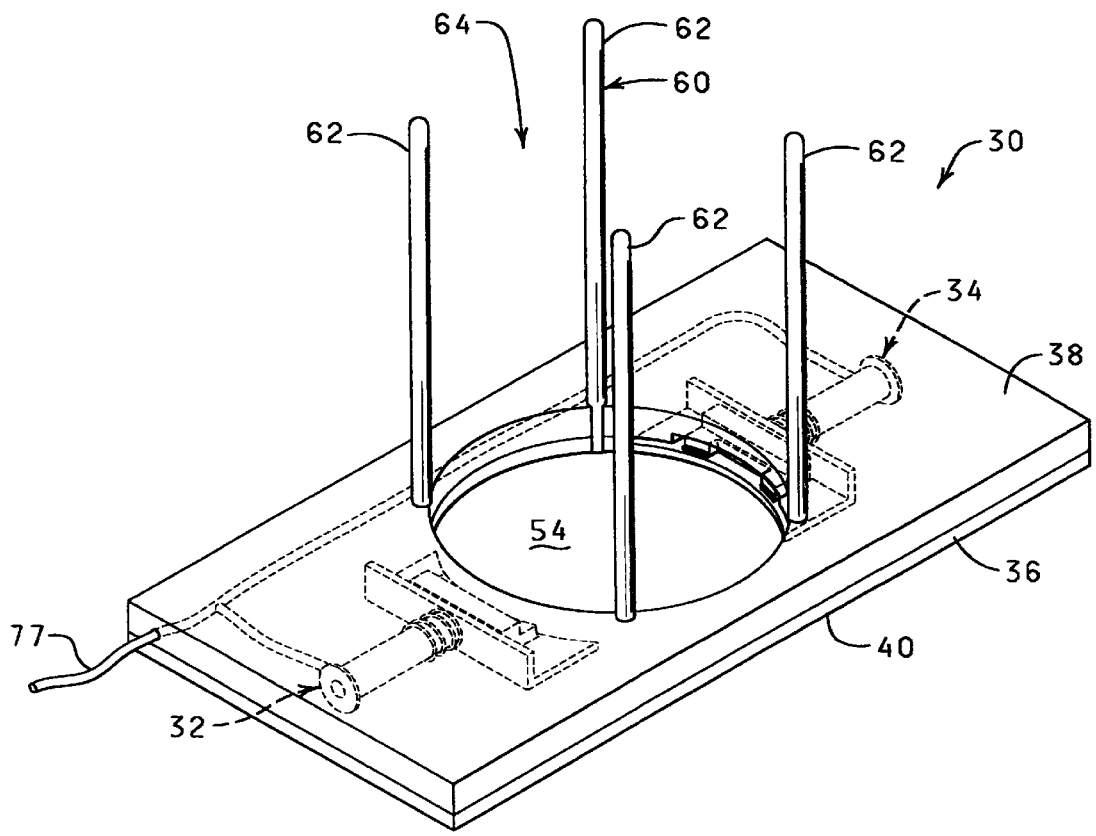
FIG. 2 is a partially cutaway, perspective view of a singulating apparatus constructed in accordance with the present invention.

Referring now to FIG. 2, shown therein is a disk singulating apparatus 30 constructed in accordance with the present invention. The disk singulating apparatus 30 is particularly well adapted for separating or discharging an optical disk from the bottom of a stack of aligned optical disks, such as the stack 26 illustrated in FIG. 1A. The disk singulating apparatus 30 includes a pair of feed gate subassemblies 32 and 34 (shown in phantom) supported in a housing 36 in a spaced apart, diametrically opposing relationship.

Figure 3A:
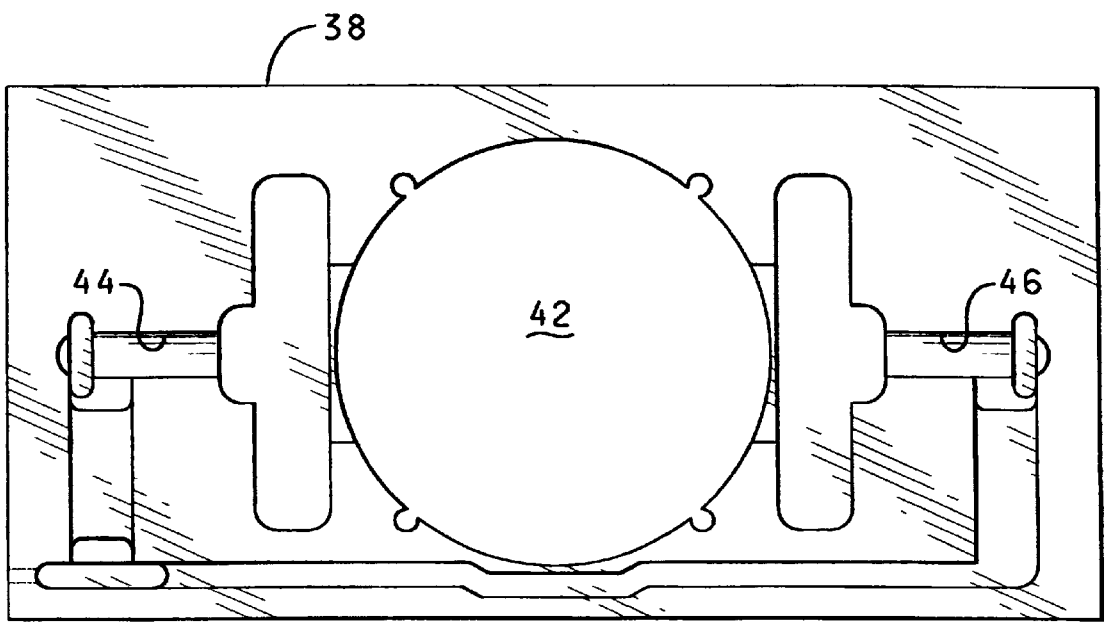
FIG. 3A is a plan view of the bottom side of an upper portion of the housing.
Figure 3B:
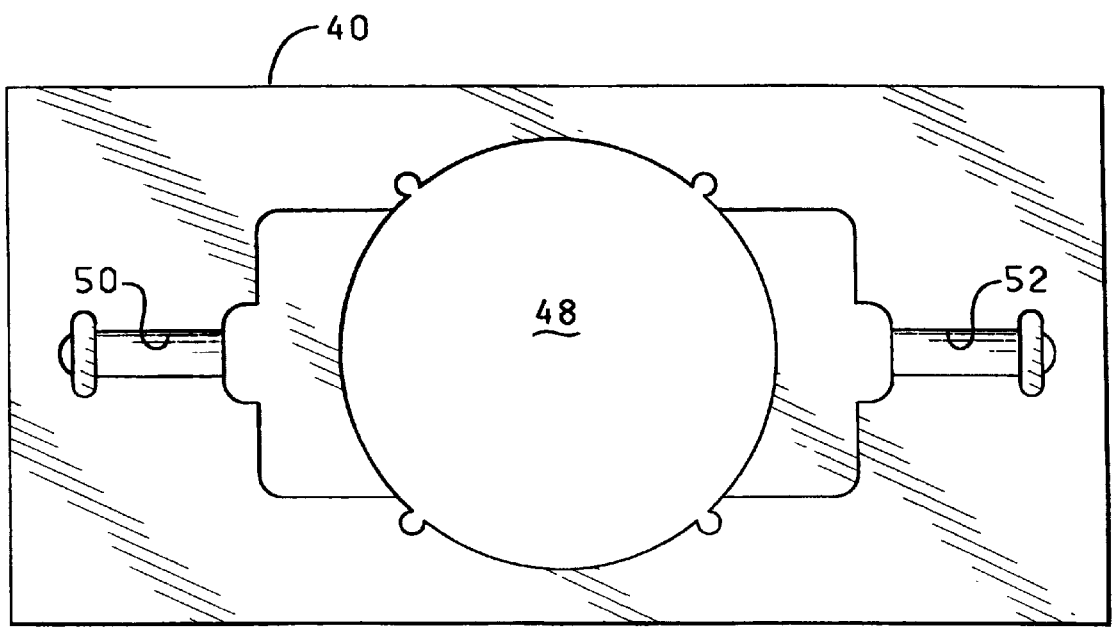
FIG. 3B is a plan view of the top side of a bottom portion of the housing.

With reference to FIGS. 2–4, the housing 36 includes a first portion 38 and a second portion 40. The first portion 38 is a plate member having an opening 42 formed therethrough and a pair of diametrically opposed recesses 44 and 46 formed on one side thereof. Likewise, the second portion 40 is a plate member having an opening 48 formed therethrough and a pair of diametrically opposed recesses 50 and 52 formed on one side thereof.

As illustrated in FIG. 4, the first and second portions 38 and 40 are secured together with the openings 42 and 48 aligned with each other to form a disk receiving opening 54 and the recesses 44 and 46 of the first portion 38 superimposed on the recesses 50 and 52 of the second portion 40 to form a cavity 55 which is in open communication with the disk receiving opening 54. Each side of the cavity 55 has a bore portion 56, a counter bore portion 57, an enlarged inner portion 58, and an enlarged outer portion 59. The diameter of the disk receiving opening 54 is sufficient to permit an optical disk to pass freely therethrough.

As shown in FIG. 2, a rack assembly 60 is mounted to the housing 36 for guiding a stack of optical disks into and through the disk receiving opening 54 of the housing 36. The rack assembly 60 is shown herein to include a plurality of support rods 62 mounted to the housing 36 about the periphery of the disk receiving opening 54 to define a disk feed channel 64.

In use, a stack of optical disks, such as the stack 26, is loaded into the disk feed channel 64 and supported in the disk receiving opening 54 of the housing 36 by the feed gate subassemblies 32 and 34 which are supported in the cavity 55 of the housing 36 on diametrically opposing sides of the disk receiving opening 54. In addition to supporting the stack of optical disks, the function of the feed gate subassemblies 32 and 34 is to release or discharge the optical disks from the bottom of the stack one at a time. The feed gate subassemblies 32 and 34 assure that only a single disk will be discharged from the stack at one time, while the remainder of the disks in the stack remain supported and in position so that upon the release of the bottom disk, the next disk in the stack, which is now the bottom disk, is in position to be released in accordance with a programmed sequencing.

FIG. 5 is a partially cutaway, side elevational view of the feed gate subassembly 32 supported in the housing 36, and FIG. 6 is a top view of the feed gate subassembly 32. The feed gate subassemblies 32 and 34 are identical in construction and operation. Thus, only the feed gate subassembly 32 will be described in detail hereinbelow with reference to FIGS. 5 and 6.

The feed gate subassembly 32 comprises a cylinder 66, a support plate 68, a clamp block 70, and a spring 72. The cylinder 66 is preferably a single-acting, pneumatic cylinder of conventional design with an internal piston 74 which selectively extends and retracts a piston rod 76 when attached to a controlled pressurized air supply (not shown) at an end 78 of the cylinder 66 via a conduit 77 (FIGS. 2 and 6). The cylinder 66 is slidably disposed in the bore portion 56 (FIG. 4) and the counter bore portion 57 of the cavity 55 of the housing 36. The piston rod 76 extends from an end 79 of the cylinder 66 in a radially inward direction toward the disk receiving opening 54.

It should be noted that while the cylinder 66 is preferably pneumatically actuated, other types of actuation, including hydraulic and electrical, can be employed, but are less preferred. It should also be noted that while the cylinder 66 is preferably supported in the housing 36 described above, the cylinder 66 could alternatively be slidably supported in a cylinder block in a manner disclosed in U.S. Pat. No. 5,050,023, issued on Sept. 17, 1991, to H. D. Ashby, which is hereby incorporated herein by reference.

The support plate 68 is an L-shape member having a connecting flange 80 and a support flange 82. The connecting flange 80 is rigidly secured to the end 79 of the cylinder 66 whereby the piston 74 and the piston rod 76 are reciprocatingly movable relative to the cylinder 66 and the support plate 68. The support flange 82 has an arcuate peripheral edge 84, which is configured to conform to the contour of a portion of the outer peripheral edge 24 of the optical disk 10 (FIG. 1). The support plate 68 is slidably disposed in the enlarged inner portion 58 (FIGS. 4 and 6) of the cavity 55 of the housing 36 so as to permit reciprocating movement of the support plate 68 therein. The support flange 82 is extendible into the disk receiving opening 54 for supporting a stack of optical disks such as the stack 26 (FIG. 1A).

The spring 72 is mounted in the counter bore portion 57 of the cavity 55 and extends about the cylinder 66 so that one end of the spring 72 bears against the end of the counter bore portion 57 and the other end of the spring 72 bears against the back side of the connecting flange 80. The resilient bias of the spring 72 tends to bias the support plate 68 and the cylinder 66 radially inward, thereby extending the support flange 82 of the support plate 68 into the disk receiving opening 54 a distance sufficient so that the bottom most disk of a stack of optical disks can rest on the arcuate peripheral edge 84 of the support plate 68 when the stack is positioned in the optical disk receiving opening 54 of the housing 36. Inward movement of the cylinder 66 and the support plate 68 is arrested by a stop member 86, such as a washer which is secured to the end 78 of the cylinder 66 and sized to engage the end of enlarged outer portion 59 of the cavity 55 extending about the end of the bore portion 56. The stop member 86 is reciprocatingly movable within the enlarged outer portion 59 of the cavity 55.

The clamp block 70 is connected to the distal end of the piston rod 76 and is slidably disposed on the support flange 82 of the support plate 68. The clamp block 70 is preferably constructed of a low friction material, such as polyethylene, to reduce the friction between the clamp block 70 and the support flange 82 of the support plate 68 when the clamp block 70 and the support plate 68 are moved relative to one another and to facilitate the discharge of optical disks in a manner to be described in detail below. The clamp block 70 has a planar surface 88 and a pair of spaced apart lower protrusions 90a and 90b. Each protrusion 90a and 90b has an arcuate surface 92 and a lip 94 extending therefrom. Each lip 94 has an edge engaging surface 96 and a stack support surface 98.

As best shown in FIG. 6, the edge engaging surfaces 96 of the lips 94 have an arcuate configuration which is conformable to the contour of the outer peripheral edge of optical disks. The height of the edge engaging surfaces 96 is less than the thickness of an optical disk whereby the edge engaging surfaces 96 are dimensioned for abutting engagement with the outer peripheral edge of a single optical disk. More specifically, the lips 94 of the clamp block 70 are positioned adjacent to the upper surface of the support flange 82 of the support plate 68 whereby the edge engaging surfaces 96 of the clamp block 70 are abuttingly engagable with a portion of the outer peripheral edge of the optical disk supported on the arcuate peripheral edge 84 of the support flange 82.

The sequential operation of the disk singulating apparatus 30 will now be described in further detail with reference to FIGS. 7A–7D. First, the stack 26 of optical disks 10 is placed into the disk feed channel 64 formed by the support rods 62. The support rods 62 function in cooperation with the feed gate subassemblies 32 and 34 to retain the optical disks 10 in a neat stack with the outer peripheral edges 24 of the optical disks 10 aligned. The optical disks 10 are urged by gravity toward the disk receiving opening 54 of the housing 36 where further gravitation is prevented by the interposition of the feed gate subassemblies 32 and 34. In particular, the springs 72 of the feed gate subassemblies 32 and 34 bias the cylinders 66 and the support plates 68 in a radially inward direction such that a portion of the support flange 82 of the support plates 68 extends into the disk receiving opening 54 a distance sufficient to support the stack of optical disks.

To discharge the bottom disk 10b from the stack 26, the cylinders 66 are simultaneously pressurized to actuate the piston 74 and the piston rod 76 (FIG. 5) in a radially inward direction so as to cause the clamp blocks 70 to move to a disk engaging position (FIG. 7B) wherein the edge engaging surfaces 96 of the clamp blocks 70 are caused to abuttingly engage a portion of the outer peripheral edge 24 of the bottom optical disk 10b, which is supported by the arcuate peripheral edge 84 of the support plate 68.

As previously mentioned, one of the advantages of optical disks is their durability. This durability is due in part to the fact that optical disk have a plastic base which has an elastic quality that permits the base to be bent when a force is applied to its peripheral edge and to spring back to its original form upon removal of the force. As will become apparent below, it is the elasticity of an optical disk that the present invention relies on in order to effectively discharge an optical disk from the bottom of a stack. That is, upon the edge engaging surfaces 96 of the clamp blocks 70 engaging opposing portions of the outer peripheral edge 24 of the bottom optical disk 10b, the clamp blocks 70 continue to move radially inward whereby the clamp blocks 70 of the feed gate subassemblies 32 and 34 cooperate to apply a compressive force on the optical disk 10b so as to cause the optical disk lob to bow slightly in a downward direction, as illustrated in FIG. 7B. The bowing of the optical disk 10b enables the edge engaging surfaces 96 of each of the clamp blocks 70 to extend inwardly beyond the outer peripheral edge 24 of the adjacent optical disk 10 whereby the stack support surfaces 98 of the clamp blocks 70 are caused to be positioned beneath a portion of the adjacently disposed optical disk 10.

With the clamp blocks 70 extended inwardly to slightly bow the bottom disk 10b and to position the stack support surfaces 98 beneath the adjacent optical disk, the planar surface 88 of the clamp blocks 70 engages an inward surface of the housing 36. Engagement of the planar surface 88 of the clamp blocks 70 with the inward surface prevents further inward movement of the clamp blocks 70. Thus, the cylinders 66 are forced to slide in a radial outward direction within the bore portion 56 of the cavity 55 in reaction to the continued application of fluid pressure on the piston 74, as illustrated by FIG. 7C. As a result of the cylinders 66 moving in an outward direction, the support plates 68, which are connected to the cylinders 66, are retracted from the disk receiving opening 54 of the housing 36 such that the support plates 68 are moved to a non-supporting position relative to the bottom optical disk 10b.

Upon the support plates 68 being retracted to the non-supporting position, as shown in FIG. 7C, the compressed optical disk 10b is allowed to be discharged from its position at the bottom of the stack 26. The elasticity of the optical disk in combination with the low friction engagement between the edge engaging surfaces 96 and the outer peripheral edge 24 of the optical disk 10b, causes the optical disk 10b to slide off of the edge engaging surfaces 96 of the clamp blocks 70 and gravitate away from the stack 26.

After a control device (not shown) which controls the charging of the actuating fluid to each of the cylinders 66 has timed out, the cylinders 66 are depressurized. In response, each cylinder 66 slides in a radially inward direction due to the bias of the springs 72 until the stop members 86 arrest the cylinders 66 further movement. At this point, the support flanges 82 of the support plates 68 will again be positioned in the disk receiving opening 54 in a disk supporting position (FIG. 7D).

With the cylinders 66 arrested by the stop members 86, the pistons 74 and the piston rods 76 will retract and thus cause a retraction the clamp blocks 70. The retraction of the clamp blocks 70 results in the retraction of the stack support surfaces 98 out of engagement with the stack 26 of optical disks thereby causing the stack 26 of optical disks to gravitate downwardly onto the two opposed support plates 68 (as depicted in FIG. 7A) where the next optical disk is ready for discharge from the stack.

It will be appreciated that the control device (not shown) for operating the cylinders 66 is of conventional design with pneumatic or electronic controls to sequentially operate the cylinders 66, and thus need not be described in detail herein in that sequential control circuitry is well known to persons of ordinary skill in this art and related arts. It will also be appreciated that the present invention does not require such sophistication of control circuitry, and can be used with simple sequencing control, including the use of conventional, manually operated switches.

Figure 8:
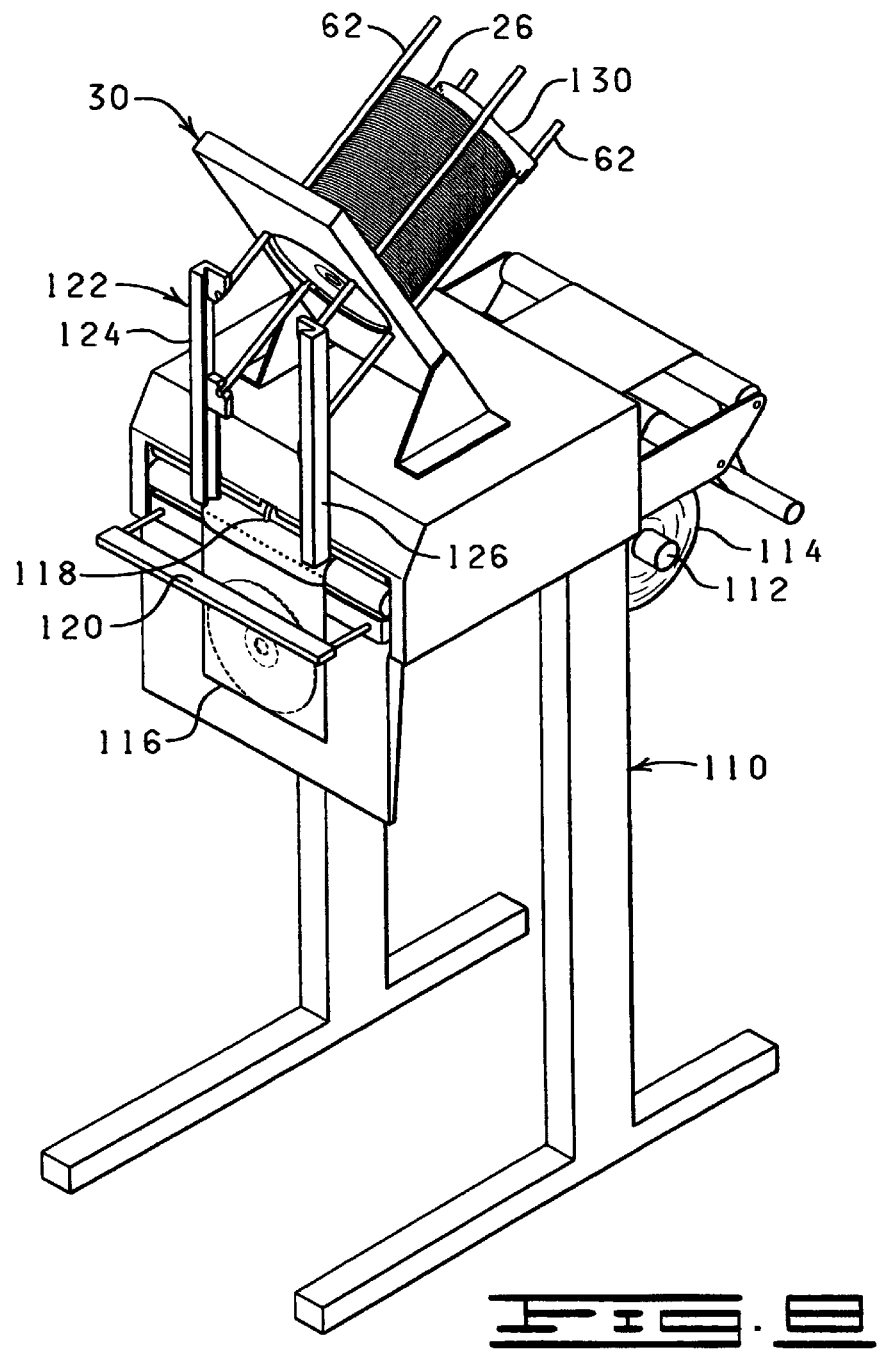
FIG. 8 is a perspective view of the singulating apparatus of the present invention shown incorporated with a bagging machine.
Figure 9:
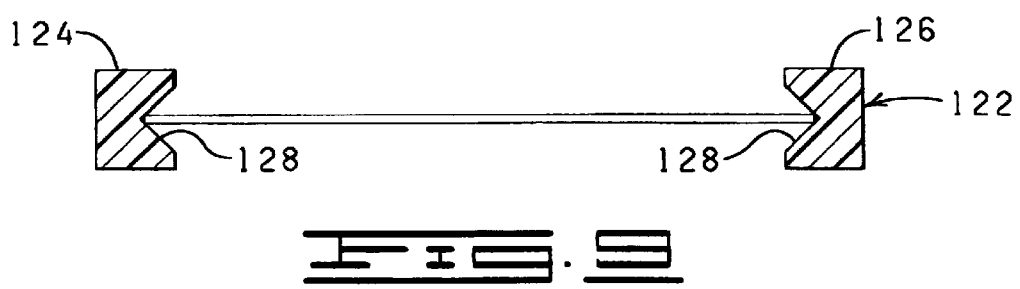
FIG. 9 is a cross-sectional representation of a pair of side rails showing an optical disk disposed therebetween.

The disk singulating apparatus 30 described above is intended for automatically feeding optical disks to various types of optical disk production equipment. For example, the disk singulating apparatus 30 can be employed to feed optical disks to duplication equipment, packaging equipment, labeling equipment, printing equipment, or an inspection station. FIG. 8 illustrates the disk singulating apparatus 30 mounted to a conventional bagging machine 110. Bagging machines are well known in the art. An example of such a bagging machine is the model sold by Allied Automation, Inc., Dallas, Tex. 75244 as its Model No. 6500. A brief description of the bagging machine 110, together with the modifications thereto required for the present invention, is believed adequate for an understanding of the present invention. The bagging machine 110 has a roller 112 for supporting a roll of plastic bags 114. The bags are pulled off of the roller 112 and through the bagging machine 110 until a lead bag 116 is supported in a loading position. With the bag 116 in the loading position, a bag opening assembly 118 blows compressed air at the bag opening to open the bag 116 and permit the bag 116 to be filled. When the bag 116 is filled with product, a heated seal bar 120 is caused to be drawn into contact with the upper end of the bag 116 to close and seal the bag 116. With the bag 116 sealed, the heated seal bar 120 is pivoted down to tear the sealed bag from an adjacent bag and allow the bag 116 to drop into a receiving bin (not shown).

To feed an optical disk into the lead bag 116, the disk singulating apparatus 30 is mounted to the top end of the bagging machine 110, as substantially shown. A guide assembly 122 is provided between the disk singulating apparatus 30 and the loading position of the bagging machine 110 to guide the optical disk discharged from the disk singulating apparatus 30 into the open bag 116. The guide assembly 122 may comprise a pair of parallel side rails 124 and 126, each having a groove 128 (shown in FIG. 8). The support rods 62 of the rack assembly 60 are extended through the housing 36 to support the stack of optical disks and to guide the discharged optical disks into engagement with the side rails 124 and 126. A disk follower 129 is slidably attached to the support rods 62 to maintain the optical disks in alignment with the disk singulating apparatus 30. To prevent the formation of scratches in the optical disk as it is traveling along the side rails 124 and 126, the grooves 128 can be formed to have a substantially V-shaped configuration, as illustrated in FIG. 8, whereby only a small portion of an optical disk gravitating through the guide assembly 122 will actually be in contact with the side rails 124 and 126. To coordinate the operation of the disk singulating apparatus 30 and the bagging machine 110, the control device (not shown) of the disk singulating apparatus 30 is interfaced with the control device of the bagging machine 110 in a manner well known in the art.

While the singulating apparatus of the present invention has been described for discharging an optical disk from the bottom of a stack of optical disks, it should be understood that the invention is not limited to the use of optical disks, but rather can be utilized for discharging any disk from the bottom of a stack of disks wherein the disk has sufficient flexibility to permit effective operation of the singulating apparatus. For example, the disk could be a magnetic disk and, as long as such magnetic disk contained the sufficient flexibility to allow the operation of the singulating apparatus in the manner hereinbefore described, such disk is considered to be within the scope of the present invention and the use of the singulating apparatus for discharging such disk from the bottom of a stack of disks.

Figure 10:
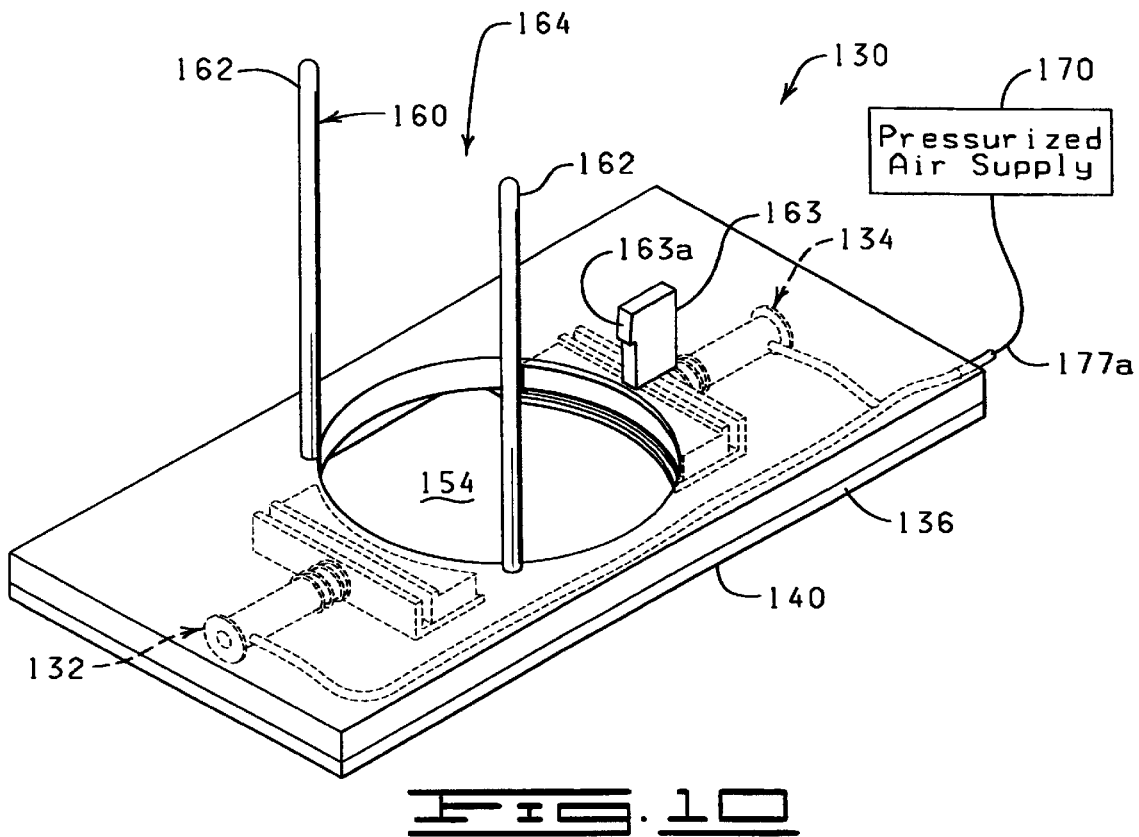
FIG. 10 is a perspective view of another embodiment of a singulating apparatus constructed in accordance with the present invention.

Referring now to FIG. 10, shown therein is another embodiment of a disk singulating apparatus 130 constructed in accordance with the present invention. The disk singulating apparatus 130 is particularly well adapted for separating or discharging an optical disk from the bottom of a stack of aligned optical disks, such as the stack 26 illustrated in FIG. 1A. The disk singulating apparatus 130 is similar in construction to the disk singulating apparatus 30 except for the modifications described below. Most notably, the disk singulating apparatus 130 differs from the disk singulating apparatus 30 in that the disk singulating apparatus 130 is operated in a manner so as not to compress or deform the optical disk being discharged from the stack. However, similar to the disk singulating apparatus 30, the disk singulating apparatus 130 includes a pair of feed gate subassemblies 132 and 134 (shown in phantom) supported in a housing 136 in a spaced apart, diametrically opposing relationship.

Figure 11A:
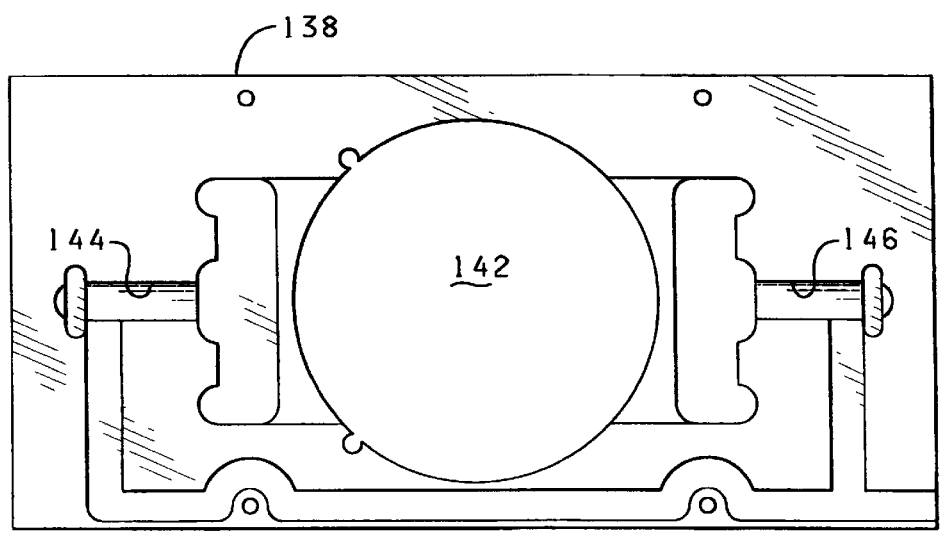
FIG. 11A is a plan view of the bottom side of an upper portion of the housing.
Figure 11B:
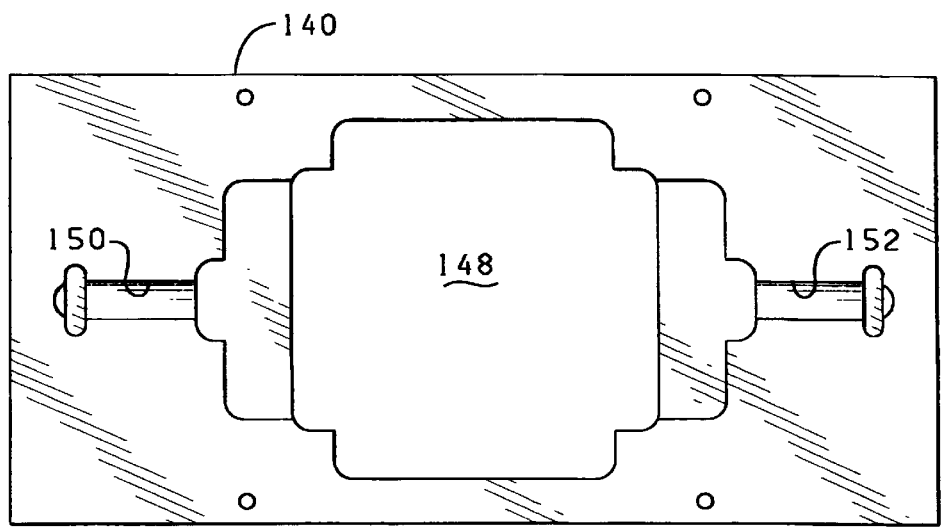
FIG. 11B is a plan view of the top side of a bottom portion of the housing.
Figure 12:
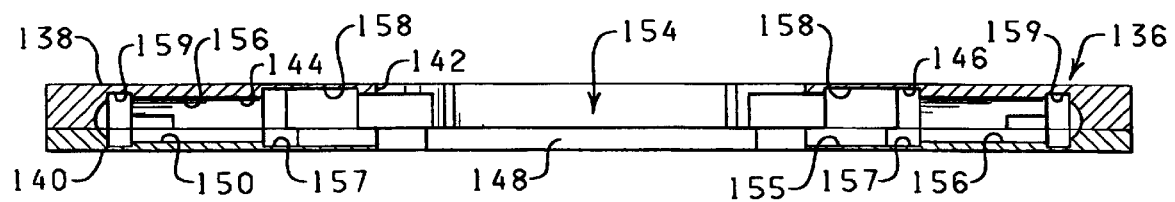
FIG. 12 is a cross-sectional view of the housing.

With reference to FIGS. 10–12, the housing 136 includes a first portion 138 and a second portion 140. The first portion 138 is a plate member having an opening 142 formed therethrough and a pair of diametrically opposed recesses 144 and 146 formed on one side thereof. Likewise, the second portion 140 is a plate member having an opening 148 formed therethrough and a pair of diametrically opposed recesses 150 and 152 formed on one side thereof.

As illustrated in FIG. 12, the first and second portions 138 and 140 are secured together with the openings 142 and 148 aligned with each other to form a disk receiving opening 154 and the recesses 144 and 146 of the first portion 138 superimposed on the recesses 150 and 152 of the second portion 140 to form a cavity 155 which is in open communication with the disk receiving opening 154. Each side of the cavity 155 has a bore portion 156, a counter bore portion 157, an enlarged inner portion 158, and an enlarged outer portion 159. The diameter of the disk receiving opening 154 is sufficient to permit an optical disk to pass freely therethrough.

As shown in FIG. 10, a hopper or rack assembly 160 is mounted to the housing 136 for guiding a stack of optical disks into and through the disk receiving opening 154 of the housing 136. The rack assembly 160 is shown herein to include a pair of support rods 162 and a stiction member 163 mounted to the housing 136 about the periphery of the disk receiving opening 154 to define a disk feed channel 164.

In use, a stack of optical disks, such as the stack 26, is loaded into the disk feed channel 164 and supported in the disk receiving opening 154 of the housing 136 by the feed gate subassemblies 132 and 134 which are supported in the cavity 155 of the housing 136 on diametrically opposing sides of the disk receiving opening 154. In addition to supporting the stack of optical disks, the function of the feed gate subassemblies 132 and 134 is to release or discharge the optical disks from the bottom of the stack one at a time. The feed gate subassemblies 132 and 134 assure that only a single disk will be discharged from the stack at one time, while the remainder of the disks in the stack remain supported and in position so that upon the release of the bottom disk, the next disk in the stack, which is now the bottom disk, is in position to be released in accordance with a programmed sequencing.

Figure 13:
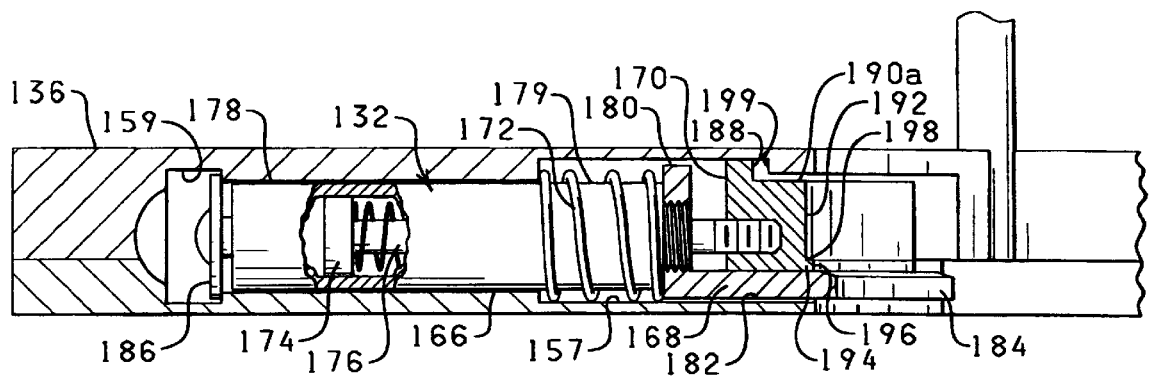
FIG. 13 is a partially cutaway, side elevational view of one of the feed gate subassemblies.
Figure 14:
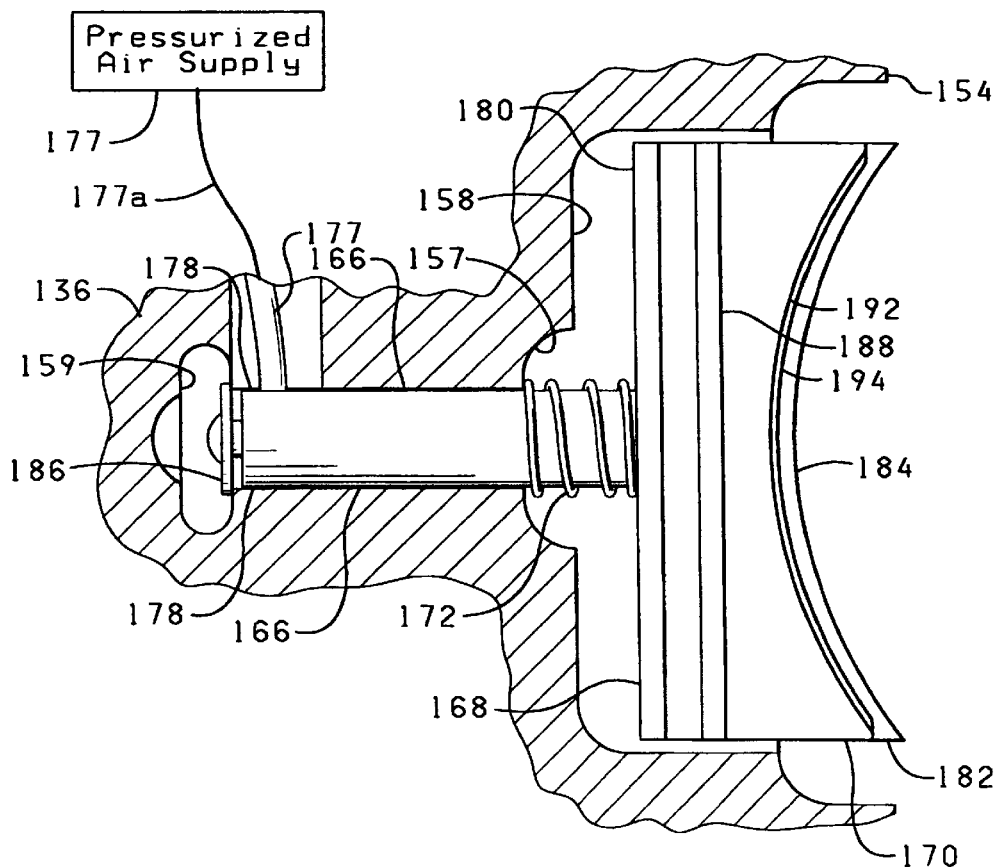
FIG. 14 is a partially cutaway, top view of the feed gate subassembly of FIG. 13.

FIG. 13 is a partially sectional view of the feed gate subassembly 132 supported in the housing 136, and FIG. 14 is a top view of the feed gate subassembly 132. The feed gate subassemblies 132 and 134 are identical in construction. Thus, only the feed gate subassembly 132 will be described in detail hereinbelow with reference to FIGS. 13 and 14.

The feed gate subassembly 132 comprises a cylinder 166, a support plate 168, a clamp block 170, and a spring 172. The cylinder 166 is preferably a single-acting, pneumatic cylinder of conventional design with an internal piston 174 which selectively extends and retracts a piston rod 176 when attached to a controlled pressurized air supply 177 (FIG. 14) at an end 178 of the cylinder 166 via a conduit 177a (FIGS. 10 and 14). The cylinder 166 is slidably disposed in the bore portion 156 (FIG. 12) and the counter bore portion 157 of the cavity 155 of the housing 136. The piston rod 176 extends from an end 179 of the cylinder 166 in a radially inward direction toward the disk receiving opening 154.

It should be noted that while the cylinder 166 is preferably pneumatically actuated, other types of actuation, including hydraulic and electrical, can be employed, but are less preferred. It should also be noted that while the cylinder 166 is preferably supported in the housing 136 described above, the cylinder 166 could alternatively be slidably supported in a cylinder block in a manner disclosed in U.S. Pat. No. 5,050,023, issued on Sep. 17, 1991, to H. D. Ashby, which is hereby incorporated herein by reference.

The support plate 168 is an L-shape member having a connecting flange 180 and a support flange 182. The connecting flange 180 is rigidly secured to the end 179 of the cylinder 166 whereby the piston 174 and the piston rod 176 are reciprocatingly movable relative to the cylinder 166 and the support plate 168. The support flange 182 has an arcuate peripheral edge 184, which is configured to conform to the contour of the outer peripheral edge 24 of the optical disk 10 (FIG. 1). The support plate 168 is slidably disposed in the enlarged inner portion 158 (FIGS. 12 and 14) of the cavity 155 of the housing 136 so as to permit reciprocating movement of the support plate 168 therein. The support flange 182 is extendible into the disk receiving opening 154 for supporting a stack of optical disks such as the stack 26 (FIG. 1A).

The spring 172 is mounted in the counter bore portion 157 of the cavity 155 and extends about the cylinder 166 so that one end of the spring 172 bears against the end of the counter bore portion 157 and the other end of the spring 172 bears against the back side of the connecting flange 180. The resilient bias of the spring 172 tends to bias the support plate 168 and the cylinder 166 radially inward, thereby extending the support flange 182 of the support plate 168 into the disk receiving opening 154 a distance sufficient so that the bottom most disk of a stack of optical disks can rest on the arcuate peripheral edge 184 of the support plate 168 when the stack is positioned in the optical disk receiving opening 154 of the housing 136. Inward movement of the cylinder 166 and the support plate 168 is arrested by a stop member 186, such as a washer which is secured to the end 178 of the cylinder 166 and sized to engage the end of enlarged outer portion 159 of the cavity 155 extending about the end of the bore portion 156. The stop member 186 is reciprocatingly movable within the enlarged outer portion 159 of the cavity 155.

The clamp block 170 is connected to the distal end of the piston rod 176 and is slidably disposed on the support flange 182 of the support plate 168. The clamp block 170 is preferably constructed of a low friction material, such as polyethylene, to reduce the friction between the clamp block 170 and the support flange 182 of the support plate 168 when the clamp block 170 and the support plate 168 are moved relative to one another and to facilitate the discharge of optical disks in a manner to be described in detail below. The clamp block 170 has a planar surface 188 and a protrusion 190. The protrusion 190 has an arcuate surface 192 and a lip 194 extending therefrom. The lip 194 has an edge engaging surface 196 and a stack support surface 198.

As best shown in FIG. 14, the edge engaging surfaces 196 of the lip 194 has an arcuate configuration which is conformable to the contour of the outer peripheral edge of optical disks. The height of the edge engaging surface 196 is less than the thickness of an optical disk whereby the edge engaging surface 196 is dimensioned for abutting engagement with the outer peripheral edge of a single optical disk. More specifically, the lips 194 of the clamp block 170 is positioned adjacent to the upper surface of the support flange 182 of the support plate 168 whereby the edge engaging surfaces 196 of the clamp block 170 are abuttingly engagable with a portion of the outer peripheral edge of the optical disk supported on the arcuate peripheral edge 184 of the support flange 182.

The sequential operation of the disk singulating apparatus 130 will now be described in further detail with reference to FIGS. 15A–15F. First, the stack 26 of optical disks 10 is placed into the disk feed channel 164 formed by the support rods 162 and the stiction member 163. The stiction member 163 functions to support a portion of the stack 26 to facilitate operation of the disk singulating apparatus 130. More specifically, the stiction member 163 has an angled surface 163a. The stiction member 163 is mounted to the housing 136 such that a selected number of disks 10 pass by the stiction member 163 and are supported by the feed gate subassemblies 132 and 134. The remainder of the disks 10 are partially supported by the disks that have passed the stiction member 163 and partially supported by the angled surface 163a of the stiction member 163, thereby reducing the force exerted on the bottom disk 10b and facilitating lateral movement of the bottom disk relative to the adjacent disk. The angled surface 163a of the stiction member 163 is positioned so that upon the bottom disks 10b being discharged from the bottom of the stack, another disk is released from the stiction member 163.

The optical disks 10 are urged by gravity toward the disk receiving opening 154 of the housing 136 where further gravitation is prevented by the interposition of the feed gate subassemblies 132 and 134. In particular, the springs 172 of the feed gate subassemblies 132 and 134 bias the cylinders 166 and the support plates 168 in a radially inward direction such that a portion of the support flange 182 of the support plates 168 extends into the disk receiving opening 154 a distance sufficient to support the stack of optical disks.

To discharge the bottom disk 10b from the stack 26, the cylinder 166 of the feed gate subassembly 132 is pressurized to actuate the piston 174 and the piston rod 176 (FIG. 13) in a radially inward direction so as to cause the clamp block 170 to move to a disk engaging position (FIG. 15B) wherein the edge engaging surface 196 of the clamp block 170 is caused to abuttingly engage a portion of the outer peripheral edge 24 of the bottom disk 10b, which is supported by the arcuate peripheral edge 184 of the support plate 168. Engagement of the edge engaging surface 196 of the clamp block 170 with the outer peripheral edge 24 of the bottom disk 10b forces the bottom disk 10b to move laterally relative to the remainder of the stack of disks, as illustrated in FIG. 15b. The lateral movement of the bottom disk 10b enables the edge engaging surface 196 of the clamp block 170 to extend inwardly beyond the outer peripheral edge 24 of the adjacent optical disk 10 whereby the stack support surface 198 of the clamp block 170 of the feed gate subassembly 132 is caused to be positioned beneath a portion of the adjacently disposed optical disk 10.

With the clamp block 170 extended inwardly to laterally move the bottom disk 10b and to position the stack support surface 198 beneath the adjacent optical disk, the arcuate surface 192 of the clamp block 170 engages the outer peripheral edge 24 of the adjacent optical disks 10 which are supported on the opposite side by an interior surface of the housing 136 which partially defines the disk receiving opening 154. Engagement of the arcuate surface 192 of the clamp block 170 with the outer peripheral edge 24 of the adjacent optical disk 10 prevents further inward movement of the clamp block 170. If the disk being discharged is the last disk in the stack, further inward movement of the clamp block 170 is prevented by engagement of the planar surface 188 of the clamp block 170 against a surface 199 of the housing 136.

With inward movement of the clamp block 170 being retarded, the cylinder 166 of the feed gate subassembly 132 is forced to slide in a radial outward direction within the bore portion 156 of the cavity 155 in reaction to the continued application of fluid pressure on the piston 174, as illustrated in FIG. 15C. As a result of the cylinder 166 of the feed gate subassembly 132 moving in an outward direction, the support plate 168, which is connected to the cylinder 166, is retracted from the disk receiving opening 154 of the housing 136 thereby moving the support plate 168 to a non-supporting position relative to the bottom optical disk 10b.

Upon the support plate 168 of the feed gate subassembly 132 being retracted to the non-supporting position, as shown in FIG. 15C, the bottom disk 10b is freed of the support flange 182 of the support plate 168 while the opposing portion of the bottom disk 10b remains supported between the support flange 182 of the feed gate subassembly 134 and the adjacent optical disk 10. Consequently, subsequent to the support flange 182 of the feed gate subassembly 132 moving to the non-supporting position, the cylinder 166 of the feed gate subassembly 134 is pressurized to actuate the piston 174 and the piston rod 176 in an inward direction so as to cause the clamp block 170 of the feed gate subassembly 134 to move to the disk engaging position (FIG. 15D) wherein the edge engaging surface 196 of the clamp block 170 of the feed gate subassembly 134 is caused to abuttingly engage a portion of the outer peripheral edge 24 of the bottom disk 10b, and thereby move the bottom disk 10b laterally relative to the remainder of the stack of disks in a direction opposite that moved by the actuation of the cylinder 166 of the feed gate subassembly 132. Inward movement of the clamp block 170 of the feed gate subassembly 134 continues until the arcuate surface 192 of the clamp block 170 engages the outer peripheral edge 24 of the adjacent optical disk 10 which arrests the inward movement of the clamp block 170. The lateral movement of the optical disk 10b enables the edge engaging surface 196 of the feed gate subassembly 134 to extend inwardly beyond the outer peripheral edge 24 of the adjacent optical disk 10 whereby the stack support surface 198 of the clamp block 170 is caused to be positioned beneath a portion of the adjacently disposed optical disk 10.

Engagement of the arcuate surface 192 of the clamp block 170 with the outer peripheral edge 24 of the adjacent optical disk 10 prevents further inward movement of the clamp block 170 of the feed gate subassembly 134. Thus, the cylinder 166 of the feed gate subassembly 134 is forced to slide in a radial outward direction within the bore portion 156 of the cavity 155 in reaction to the continued application of fluid pressure on the piston 174, as illustrated in FIG. 15E. As a result of the cylinder 166 of the feed gate subassembly 134 moving in an outward direction, the support plate 168, which is connected to the cylinder 166, is retracted from the disk receiving opening 154 of the housing 136 and the support plate 168 is moved to a non-supporting position relative to the bottom optical disk 10b.

Upon the support plate 168 of the feed gate subassembly 134 being retracted to the non-supporting position, as illustrated in FIG. 15E, the bottom disk 10b is caused to be discharged from its position at the bottom of the stack 26.

After a control device (not shown) which controls the charging of the actuation fluid to each of the cylinders 166 has timed out, the cylinders 166 are depressurized. In response, each of the cylinders 166 slides in a radially inward direction due to the bias of the springs 172 until the stop members 186 arrest the cylinders 166 further movement. At this point, the support flanges 182 of the support plates 168 will again be positioned in the disk receiving opening 154 in a disk supporting position (FIG. 15F).

With the cylinders 166 arrested by the stop members 186, the pistons 174 and the piston rods 176 will retract and thus cause a retraction of the clamp blocks 170. The retraction of the clamp blocks 170 results in the retraction of the stack support surfaces 198 out of engagement with the stack 26 of optical disks thereby causing the stack 26 of optical disks to gravitate downwardly onto the two opposed support plates 168 (as depicted in FIG. 15F) where the next optical disk is ready for discharge from the stack.

It will be appreciated that the control device (not shown) for operating the cylinders 166 is of conventional design with pneumatic or electronic controls to sequentially operate the cylinders 166, and thus need not be described in detail herein in that sequential control circuitry is well known to persons of ordinary skill in this art and related arts.

The disk singulating apparatus 130 described above is intended for automatically feeding optical disks to various types of optical disk manipulation equipment. For example, the disk singulating apparatus 130 can be employed to feed optical disks to disk manipulation mechanisms, such as duplicators, packaging mechanisms, labeling mechanisms, printing mechanisms, or testing mechanisms.

Figure 16:
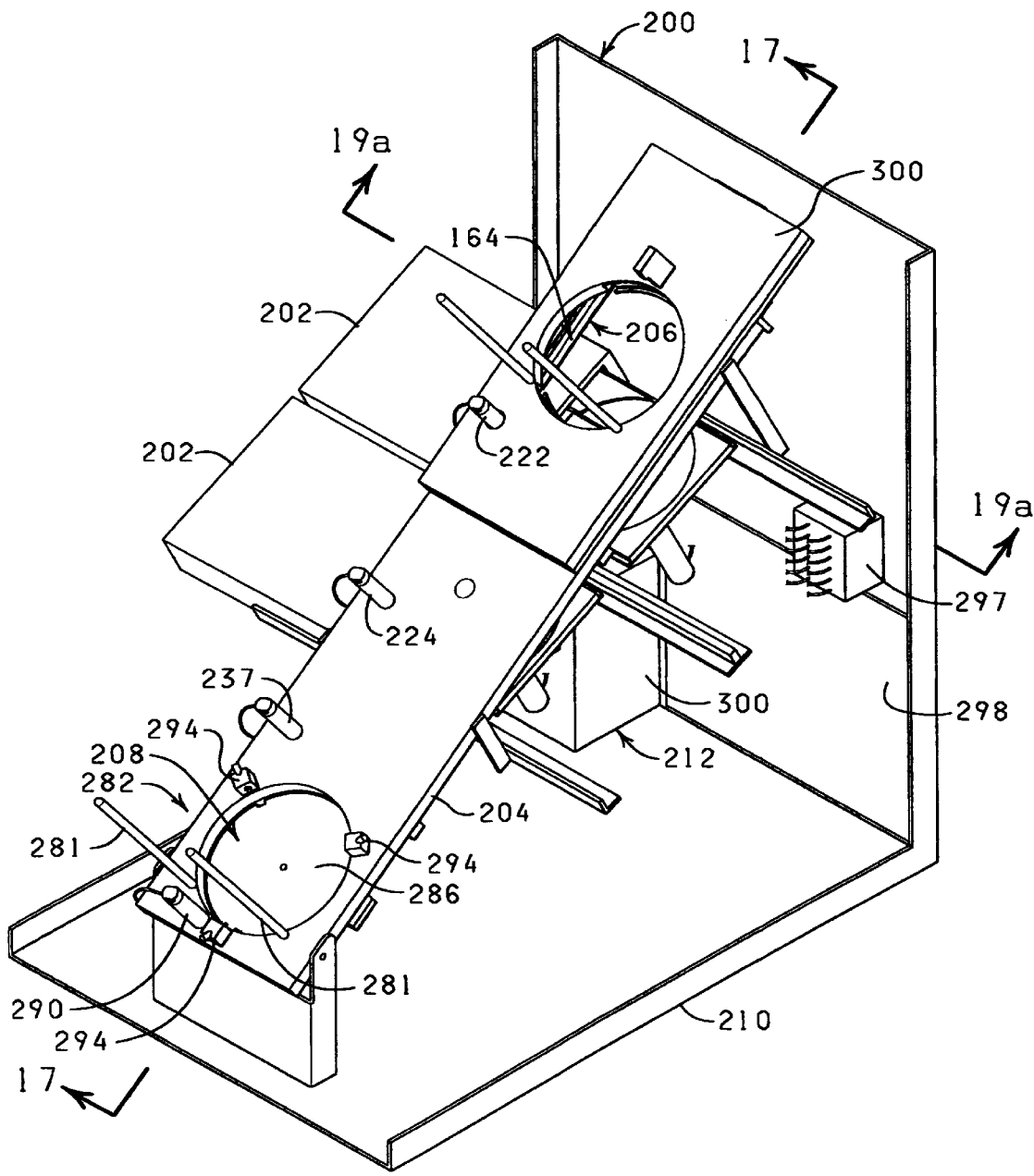
FIG. 16 is a perspective view of a disk conveying apparatus constructed in accordance with the present invention.
Figure 17:
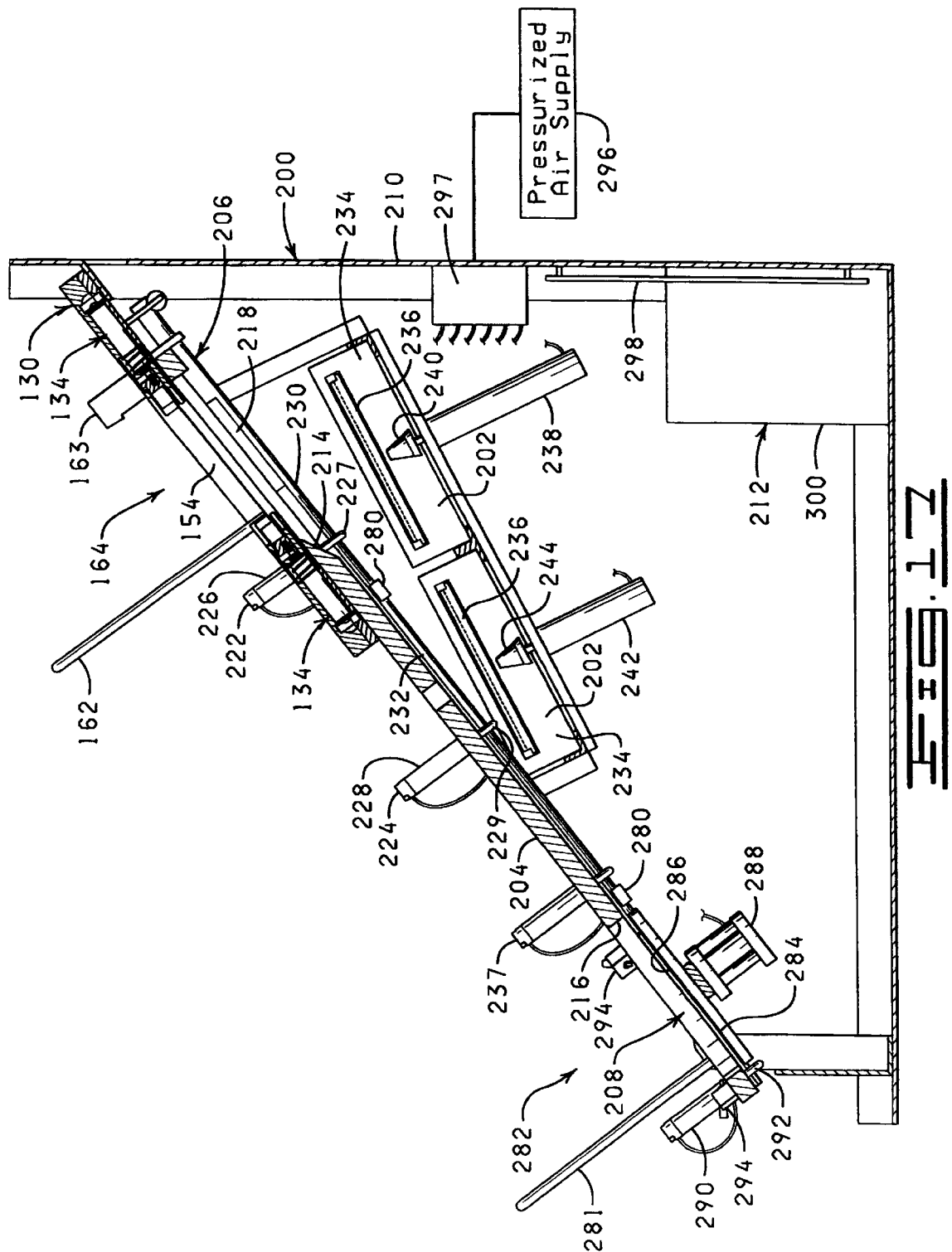
FIG. 17 is a partially cross sectional view of the disk conveying apparatus of FIG. 16.

FIGS. 16 and 17 illustrate the disk singulating apparatus 130 incorporated as part of a disk conveyance apparatus 200 constructed in accordance with the present invention. The disk conveyance apparatus 200 is illustrated in FIGS. 16 and 17 as being used to convey optical disks to one of two disk manipulating mechanisms 202, which, by way of example, are illustrated in FIGS. 16 and 17 as being a pair of CD-R duplicating mechanisms. It will be appreciated, however, that any number of disk manipulating mechanisms may be utilized with the disk conveyance apparatus 200 and that more than one type of disk manipulating mechanism may be utilized. For example, the disk conveyance apparatus 200 may be used to convey a disk to a duplicating mechanisms and thereafter convey the disk to a labeling mechanism.

In addition to the disk singulating apparatus 130, the disk conveyance apparatus 200 includes a base plate 204, a disk valve assembly 206, a disk storage station 208, a support structure 210, and a control system 212. The base plate 204 is provided with an opening 214 (FIG. 17) which is alignable with the disk receiving opening 154 of the disk singulating apparatus 130 and an opening 216 formed at an opposing end of the base plate 204. The disk singulating apparatus 130 is mounted to the base plate 204 such that the disk receiving opening 154 of the disk singulating apparatus 130 is aligned with the opening 214 of the base plate 204. The combination of the disk singulating apparatus 130 and the base plate 204 are secured to the support structure 210 so that the disk singulating apparatus 130 and the base plate 204 are set at an angle, such as shown in FIGS. 16 and 17, to permit the disk conveying apparatus 200 to take advantage of the effects of gravity. The disk singulating apparatus 130 and the base plate 204 are supported so that the disk singulating apparatus 130 is positioned above the disk storage station 208 of the base plate 204 wherein the disk singulating apparatus 130 is characterized as being positioned upstream of the disk storage station 208.

As described above, in reference to FIGS. 15A–15E, a stack of optical disks is placed into the disk feed channel 164 formed by the support rods 162 and the stiction member 163. The optical disks are urged by gravity toward the disk receiving opening 154 where further gravitation is prevented by the interposition of the feed gate subassemblies 132 and 134 (FIG. 17). Upon the bottom disk of the stack being discharged by the disk singulating apparatus 130 in the manner described above, the disk moves into a disk track 218 formed by the disk valve assembly 206 wherein the disk is allowed to gravitate down the disk track 218 into engagement with a first gate 222 or a second gate 224.

The first gate 222 includes a cylinder 226 and a retractable plunger 227, and the second gate 224 includes a cylinder 228 and a retractable plunger 229. The first gate 222 is disposed through the disk singulating apparatus 130 and the base plate 204. The plunger 227 of the first gate 222 is interposed in the disk track 218 to arrest the movement of a disk gravitating down the disk track 218 upon the cylinder 226 being energized. Conversely, the plunger 227 is withdrawn from the disk track 218 to permit passage of a disk by the first gate 222 upon de-energizing the cylinder 226. The second gate 224 is disposed through the base plate 204 downstream of the first gate 222. The plunger 229 of the second gate 224 is interposed in the disk track 218 to arrest the movement of a disk gravitating through the disk track 218 upon energizing the cylinder 228 of the second gate 224, and the plunger 229 is withdrawn from the disk track 218 to permit passage of the disk by the second gate 224 upon de-energizing the cylinder 228 of the second gate 224. The plungers 227 and 229 of the first and second gates 222 and 224 cooperate with the disk valve assembly 206 to define a first disk holding station 230 and a second disk holding station 232, respectively.

One disk manipulating mechanisms 202 is secured below each of the disk holding stations 230 and 232 (FIG. 17). The disk manipulating mechanisms 202 are illustrated in FIGS. 16 and 17 as being duplicating mechanisms, and thus, include a disk drive 234 and a retractable tray 236 adapted for receiving a disk and loading the disk into the disk drive 234. Duplicating mechanisms are well known in the art. An example of such a duplicator is the model sold by TEAC Corporation as its Model No. CD-R55S.

While only two disk manipulating mechanisms 202 have been illustrated herein with the disk manipulating mechanisms 202 arranged side by side, it should be appreciated that any number of disk manipulating mechanisms may be utilized with the disk conveyance apparatus 200 and arranged in a variety of different configurations. For example, it is contemplated that several disk manipulating mechanisms be stacked in a generally vertical arrangement whereby disks may be more efficiently processed. In other words, the disk conveying apparatus 200 of the present invention may continue to transfer disk to and from certain disk manipulating mechanisms while another disk manipulating mechanism operating.

A third gate 237 is shown secured to the base plate 204 downstream of the second gate 224, but with no corresponding disk manipulating mechanism positioned below the third gate 237. However, it will be understood that the third gate 237 is adapted to be used for holding a disk which is to be transferred to an additional disk manipulating mechanism, such as another duplicating devise, or a labeling or printing device.

A disk positioned in the first disk holding station 230 is transported to the disk drive 234 of the corresponding disk manipulating mechanism 202 by an elevator cylinder 238 having a cone shaped rod end 240, and a disk positioned in the second disk holding station 232 is transported to the disk drive 234 of the corresponding disk manipulating mechanism 202 by an elevator cylinder 242 having a cone shaped rod end 244. Each of the elevator cylinders 238 and 242 is supported so as to be in alignment with the disk holding stations 230 and 232, respectively, and the trays 236 of the disk manipulating mechanism 202 when the trays 236 are in an extended position as shown in FIGS. 16 and 17. Further, each of the elevator cylinders 238 and 242 has a stroke length sufficient to permit the cone shaped rod end 240 or 244 to be inserted into the central opening of a disk and supportingly engage the disk in the respective disk holding station 230 or 232 and lower the disk into the tray 236 of the disk manipulating mechanism 202 upon de-energizing the elevator cylinders 238 and 242.

With the disk positioned in the tray 236 of the disk manipulating mechanism 202, the tray 236 is retracted into the disk drive 234 where the duplicating process or other disk manipulation process. Upon the manipulation process ending, the tray 236 is extended whereby the cone shaped rod end 240 or 244 is able to return the disk to the disk holding station 230 or 232.

As mentioned above, the disk valve assembly 206 defines the disk track 218 which permits an optical disk to gravitate downwardly after being discharged from the disk singulating apparatus 130. To this end, it is desirable that the disk valve assembly 206 be constructed so as not to damage a disk as it slides down the disk track 218 and be operable so as to selectively release the disks held in the disk holding stations 230 and 232 to permit the disk to be lowered into the disk manipulating mechanism 202.

Figure 18:
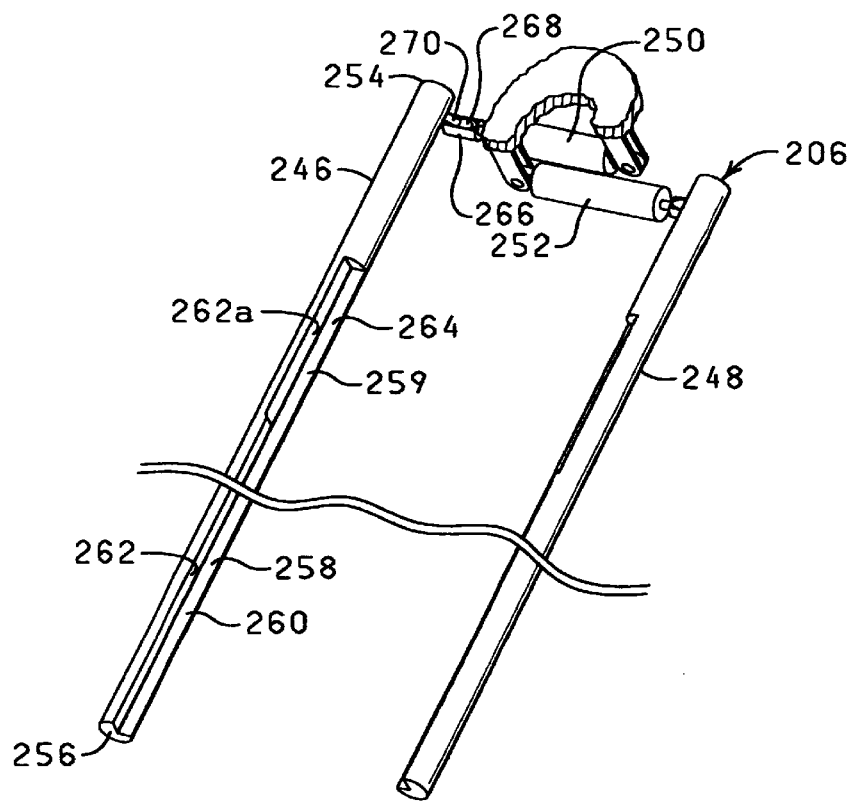
FIG. 18 is a perspective view of a disk valve assembly constructed in accordance with the present invention.

The disk valve assembly 206 is best illustrated in FIG. 18. The disk valve assembly 206 includes a pair of parallel, spaced apart side rails 246 and 248 and a pair of cylinders 250 and 252. The side rails 246 and 248 are mirror images of one another. As such, only the side rail 246 will be described in detail below.

The side rail 246 is a substantially elongated circular member having a first end 254 and a second end 256. A substantially V-shaped notch 258 is formed in the side rail 246. The notch 258 extends from the second end 256 toward the first end 254. The notch 258 has a first track portion 259 defined by a first surface 260 and a second surface 262 which is angularly disposed relative to the first surface 260. The angle between the first surface 260 and the second surface 262 is preferably about 90 degrees. The notch 258 includes an enlarged second track portion 264 defined by the surface 260 and a second surface 262a which is angularly disposed relative to the first surface 260 at an angle greater than the angle between the first surface 260 and the second surface 262. For example, the angle between the first surface 260 and the second surface 262a may be approximately 100 degrees. The enlarged second track portion 264 provides an opening for receiving a disk from the disk singulating apparatus 130.

Figure 19A:
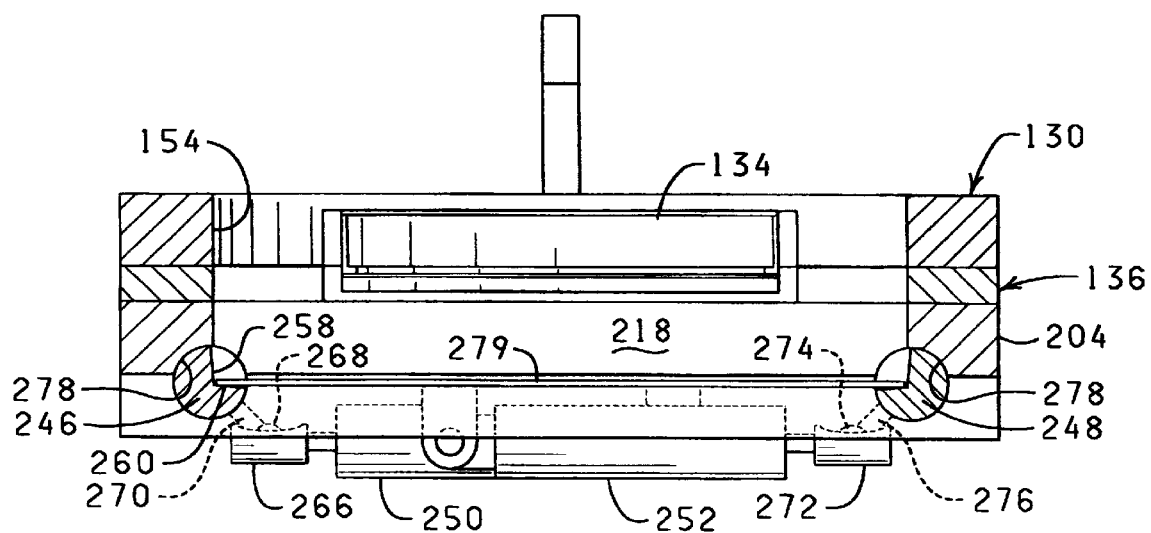
FIG. 19A is a cross sectional view of the disk conveying apparatus taken along line 19A—19A in FIG. 16 illustrating the disk valve assembly in a closed position.

Referring now to FIGS. 18, 19A and 19B, the cylinder 250 includes a socketed rod end 266 adapted to pivotally receive a ball 268 secured to the end of a rod 270 which is secured to the first end 254 of the side rail 246. Likewise, the cylinder 252 has a socketed rod end 272 adapted to pivotally receive a ball 274 connected to a rod 276 which is secured to the first end of the side rail 248. The cylinders 250 and 252 are interconnected to the side rails 246 and 248, respectively, in an opposing relationship so as to move the side rails 246 and 248 between a closed position and an open position, each of which will be described in greater detail below.

The disk valve assembly 206 is secured to the underside of the base plate 204 with the enlarged second track portion 264 of the side rail 246 and 248 aligned with the disk receiving opening 154 of the disk singulating apparatus 130. The base plate 204 is provided with a pair of parallel grooves 278 dimensioned to receive the side rails 246 and 248. The side rails 246 and 248 are supported in the grooves 278 with a plurality of spaced apart support members 280 (FIG. 17)

connected to the lower side of the base plate 204. The cylinders 250 and 252 are secured to a support surface, such as the bottom side of the housing 136 of the disk singulating apparatus 130.

FIG. 19A illustrates the disk valve assembly 206 in the closed position, while FIG. 19B illustrates the disk valve assembly 206 in the open position. In the closed position, the side rails 246 and 248 are oriented to slidingly receive an optical disk such as disk 279 illustrated in FIGS. 19A and 19B. To prevent the formation of scratches in the disk as it is travelling along the side rails 246 and 248, the side rails 246 and 248 are positioned so that the first surface 260 is angled downward and inward relative to the disk 279 whereby only the outer edge of the disk 279 gravitating through the disk valve assembly 206 contacts the side rails 246 and 248.

The disk valve assembly 206 is moved to the open position by energizing the cylinders 250 and 252 thereby causing the side rails 246 and 248 to rotate so as to move the V-shaped notch 258 inwardly and downwardly, as illustrated in FIG. 19B, to release the disk 279.

It will be understood that rotation of the side rails 246 and 248 between the closed position and the open position is only one way of actuating the side rails between the closed position and the open position. Alternatively, the side rails 246 and 248 could be adapted to be moved in opposing lateral directions.

Returning to FIGS. 16 and 17, the disk storage station 208 is positioned at the lower end of the base plate 204 and is adapted to store the disks which have been processed in the disk manipulating mechanism 202 and in turn gravitated down the disk track 218, or alternatively, cause the defective disks to pass to a reject bin (not shown). The disk storage station 208 is defined by the lower or downstream side of the base plate 204 and by a pair of elongated support rods 281. Together, the support rods 281 form a disk storage channel 282 similar to the disk feed channel 164 of the disk singulating apparatus 130, and enable the optical disks to be collected and stacked therein.

The disks traveling down the disk valve assembly 206 are transferred onto a pair of slide rails 284 (only one of the slide rails being visible in FIG. 17). The slide rails 284 allow the disks to gravitate over a pusher plate 286 which is connected to a cylinder 288. If the disk is accepted, the movement of the disk is arrested by a gate cylinder 290 which includes a retractable plunger 292. The plunger 292 is extendable so as to arrest the disk in alignment with the opening 216 of the base plate 204 and immediately over the pusher plate 286, from which position the disk can be loaded into the disk storage channel 282 by energizing the cylinder 288.

A plurality of spring loaded plunger assemblies 294 are provided about the opening 216 of the base plate 204. The plunger assemblies 294 cooperate with one another to enable to the apparatus of the present invention to incrementally build upwardly extending stacks of superimposed optical disks in the disk storage channel 282. The plunger assemblies 294 are mounted to the base plate 204 so as to extend at preselected angles with respect to the planar face of the pusher plate 286. In general, the free outer end of each of the plunger assemblies 294 is aligned immediately over the outer side edge of the pusher plate 286 so that the free outer end of the plunger assemblies 294 is positioned to contact the peripheral edge of the disk when such disk is pushed upwardly by the pusher plate 286. A more detailed description of the construction of the plunger assemblies 294 is contained in U.S. Pat. No. 5,050,023, issued to Harrel D. Ashby on Sep. 17, 1991, which is hereby incorporated herein by reference.

If a disk is determined to be defective, the plunger 292 of the gate cylinder 290 is caused to be in a retracted position whereby the defective disk passes through the disk storage station 208 into a reject bin (not shown).

As an alternative to the disk storage station 208 described above, the accepted disks could be dropped onto a spindle which is connected to a conveyor.

Conventional control systems are utilized to synchronize the operation of the various components of the disk conveying apparatus 200 described above. The control system 212 includes a pressurized air source 296, a plurality of control valves, represented by the numeral 297, for controlling the mode of operation of the various cylinders described above, a computerized controller 298 for outputting signals to such valves predetermined intervals so as to synchronize the operation of the various components of the disk conveyance apparatus 200, and a power source 300. Control valves and controllers constructed to operate in the manner herein are well known in the art. Thus, a detailed description of such components is not believed necessary to enable one skilled in the art to understand the operation of the disk conveyance apparatus 200 of the present invention.

In the operation and use of the disk conveyance apparatus 200 of the present invention, a number of optical disks which are to be processed or otherwise manipulated are loaded into the disk feed channel 164 where further gravitation of the disks is prevented by the interposition of the feed gate subassemblies 132 and 134 (FIG. 17) of the disk singulating apparatus 130. The feed gate subassemblies 132 and 134 are actuated in the manner described above so as to discharge a disk to be discharged from the bottom of the stack of disks. To facilitate the discharge of the bottom disk, the feed gate assembly positioned downstream of the other feed gate subassembly is actuated first in the sequence of operation. The disk which has been released by the feed gate subassemblies 132 and 134 drops into the disk track 218. In one exemplary sequence of operation, the discharged disk travels diagonally down the valve disk assembly 206 past the first gate 222 to the second gate 224 where it is arrested by the plunger 229 of the second gate 224. In the case where multiple disk manipulating mechanisms are provided, such as illustrated in FIGS. 16 and 17, another disk will be discharged from the disk singulating apparatus 130. This disk drops to the disk track 218 and travels diagonally down until it is stopped by the plunger 227 of the first gate 222.

With a disk in each of the disk holding stations 230 and 232, the trays 236 of the disk manipulating mechanisms 202 extend into an open position for receiving a disk, and in turn, the elevator cylinders 238 and 242 are energized to extend up and engage the corresponding disk. The cylinders 250 and 252 of the disk valve assembly 206 are then energized so as to rotate the side rails 246 and 248 into the open position and thereby release the disks. Immediately thereafter, the elevator cylinders 238 and 242 are de-energized to cause the rod ends 240 and 244 to retract and cause the disks to travel down into the trays 236 of the disk manipulating mechanisms 202. The trays 236 then retract into the disk drives 234 and the disk manipulating mechanisms begin manipulating the disks in specified manner.

Upon termination of the manipulation process, the trays 236 extend out into alignment with the rod ends 240 and 244 of the elevator cylinders 238 and 242. The elevator cylinders 238 and 242 are again energized to transport the disks back into the disk holding stations 230 and 232. Upon the elevator cylinders 238 and 242 reaching their extend positions, cylinders 250 and 252 of the disk valve assembly 206 are de-energized to cause the side rails 246 and 248 to rotate to the closed position (FIG. 19A). The elevator cylinders 238 and 242 are then de-energized causing the rod ends 240 and 244 to retract and thus leave the disks supported on the side rails 246 and 248 in the disk holding stations 230 and 232.

At this point, the second gate 224 is de-energized to cause the plunger 229 to retract and allow the disk being held in the disk holding station 232 to travel down to the disk storage station 208 where the disk is stopped by the plunger 292 of the gate cylinder 290 if the disk is determined to be acceptable. If the disk is determined to be defective, the gate cylinder 290 is de-energized so as to cause the plunger 292 to be retracted and thus cause the disk to pass through the disk storage station 208 into a reject bin (not shown). If an accepted disk is stopped by the plunger 292, the cylinder 288 is energized to cause the pusher plate 286 to move the disk past the plunger assemblies 294 into the disk storage channel 282. Upon the cylinder 288 being de-energized and the pusher plate 286 returning to a retracted position, the first gate 222 is de-energized thereby causing the disk held in the disk holding station 230 to travel down to the disk storage station 208 where it is passed to the reject bin or pushed into the disk storage channel 282.

It will be understood from the foregoing description that the control system used for timing the actuation of the several cylinders, so as to assure a rapid, orderly and non-interfering progression of disks through the apparatus, does not constitute a part of the present invention, per se, but is merely an ancillary system, the development and construction of which is well within the skill of those having ordinary skill in this art. From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method for discharging a disk from the bottom of a stack of aligned disks which is supported in a disk receiving opening, each disk having an outer peripheral edge, the method comprising:

engaging the outer peripheral edge on one side of the disk positioned at the bottom of the stack of disks so as to move the bottom disk laterally relative to the remainder of the disks in the stack in a first direction so that the engaged side of the disk is moved to a non-supported position while the opposite side of the bottom disk remains supported in the disk receiving opening;

simultaneously sliding a support surface beneath at least a portion of the adjacently disposed disk to support the remainder of the stack of disks;

engaging the outer peripheral edge on an opposite side of the disk positioned at the bottom of the stack of disks so as to move the bottom disk laterally relative to the remainder of the disks in the stack in a second direction, opposite the first direction, so that the engaged opposite side of the disk is moved to a non-supported position thereby permitting the bottom disk to gravitate away from its position at the bottom of the stack of disks; and simultaneously sliding another support surface beneath at least a portion of the adjacently disposed disk to support the remainder of the stack of disks.

* * * * *